United States Patent
Mowrer et al.

(10) Patent No.: US 11,812,101 B2
(45) Date of Patent: *Nov. 7, 2023

(54) ADDRESSABLE MEASUREMENT FRAMEWORK

(71) Applicant: The Nielsen Company (US), LLC, New York, NY (US)

(72) Inventors: Samantha M. Mowrer, Chicago, IL (US); Molly Poppie, Arlington Heights, IL (US); Scott N. Brown, Clearwater, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,653

(22) Filed: Oct. 12, 2022

(65) Prior Publication Data
US 2023/0106609 A1 Apr. 6, 2023

Related U.S. Application Data

(63) Continuation of application No. 17/200,415, filed on Mar. 12, 2021, now Pat. No. 11,516,540, which is a
(Continued)

(51) Int. Cl.
*H04N 21/44* (2011.01)
*H04N 21/4722* (2011.01)
(Continued)

(52) U.S. Cl.
CPC ... *H04N 21/44008* (2013.01); *H04N 21/4331* (2013.01); *H04N 21/44222* (2013.01); *H04N 21/4516* (2013.01); *H04N 21/4722* (2013.01)

(58) Field of Classification Search
CPC ......... H04N 21/44008; H04N 21/4331; H04N 21/44222; H04N 21/4516; H04N 21/4722
See application file for complete search history.

(56) References Cited

U.S. PATENT DOCUMENTS

| 8,655,716 B1 | 2/2014 | Barnes et al. |
| 9,641,870 B1 | 5/2017 | Cormie et al. |

(Continued)

FOREIGN PATENT DOCUMENTS

| KR | 20070013389 | 1/2007 |
| WO | 2007073078 | 6/2007 |

OTHER PUBLICATIONS

International Searching Authority, "International Search Report," mailed in connection with International Patent Application No. PCT/US2021/014696, dated May 4, 2021, 3 pages.

(Continued)

*Primary Examiner* — Mulugeta Mengesha

(57) ABSTRACT

Example methods, apparatus, systems and articles of manufacture to implement an addressable measurement framework are disclosed. Example apparatus disclosed herein perform a common homes analysis of provider data and panel data to determine a coverage footprint associated with the provider data, the provider data including at least one of return path data reported by a plurality of set-top boxes or automatic content recognition data reported by a plurality of smart media devices, and the panel data reported by media device meters. Disclosed example apparatus also weight a portion of the provider data based on the common homes analysis, weight a portion of the panel data based on the common homes analysis, and calculate an addressable advertisement rating based on the weighted portion of the provider data and the weighted portion of the panel data.

20 Claims, 11 Drawing Sheets

Related U.S. Application Data continuation of application No. PCT/US2021/014696, filed on Jan. 22, 2021.

(60) Provisional application No. 62/964,485, filed on Jan. 22, 2020.

(51) Int. Cl.
*H04N 21/442* (2011.01)
*H04N 21/45* (2011.01)
*H04N 21/433* (2011.01)

(56) References Cited

U.S. PATENT DOCUMENTS

| | | |
|---|---|---|
| 9,674,567 B1 | 6/2017 | Carter |
| 11,516,540 B2 | 11/2022 | Mowrer et al. |
| 2002/0026638 A1 | 2/2002 | Eldering et al. |
| 2002/0042914 A1 | 4/2002 | Walker et al. |
| 2003/0070167 A1 | 4/2003 | Holtz et al. |
| 2008/0281711 A1 | 11/2008 | Bridges et al. |
| 2009/0187932 A1* | 7/2009 | Rathburn ........... G06Q 30/0246 725/9 |
| 2011/0288907 A1 | 11/2011 | Harvey et al. |
| 2012/0114305 A1 | 5/2012 | Holden |
| 2014/0304061 A1* | 10/2014 | Bruich ............... G06Q 30/0242 705/14.41 |
| 2015/0089523 A1 | 3/2015 | Volovich et al. |
| 2016/0037201 A1 | 2/2016 | Kitts et al. |
| 2017/0155959 A1 | 6/2017 | Vinson et al. |
| 2017/0213239 A1* | 7/2017 | Leach ................... G06Q 50/01 |
| 2017/0300947 A1 | 10/2017 | Alla et al. |
| 2019/0364320 A1* | 11/2019 | Kitts ................ H04N 21/44224 |
| 2021/0011893 A1 | 1/2021 | Olson et al. |
| 2021/0227278 A1* | 7/2021 | Fiderer ................ H04N 21/812 |

OTHER PUBLICATIONS

International Searching Authority, "Written Opinion," mailed in connection with International Patent Application No. PCT/US2021/014696, dated May 4, 2021, 3 pages.

International Searching Authority "International Preliminary Report on Patentability", mailed in connection with International Application No. PCT/US2021/014696, dated Aug. 4, 2022, 5 pages.

United States Patent and Trademark Office, "Notice of Allowance and Fee(s) Due," mailed in connection with U.S. Appl. No. 17/200,415, dated Jul. 13, 2022, 9 pages.

* cited by examiner

ADDRESSABLE MEASUREMENT FRAMEWORK

RELATED APPLICATION(S)

This patent arises from a continuation of U.S. patent application Ser. No. 17/200,415, which is titled "ADDRESSABLE MEASUREMENT FRAMEWORK," and which was filed on Mar. 12, 2021, which is a continuation of International Patent Application No. PCT/US2021/014696, which is titled "ADDRESSABLE MEASUREMENT FRAMEWORK," and which was filed on Jan. 22, 2021, which claims the benefit of U.S. Provisional Application No. 62/964,485, which is titled "ADDRESSABLE MEASUREMENT FRAMEWORK," and which was filed on Jan. 22, 2020. Priority to U.S. Provisional Application No. 62/964,485, PCT Patent Application No. PCT/US2021/014696 and U.S. patent application Ser. No. 17/200,415 is claimed. U.S. Provisional Application No. 62/964,485, PCT Patent Application No. PCT/US2021/014696 and U.S. patent application Ser. No. 17/200,415 are hereby incorporated by reference in their entireties.

FIELD OF THE DISCLOSURE

This disclosure relates generally to audience measurement and, more particularly, to an addressable measurement framework.

BACKGROUND

Addressable commercial providers (ACPs) provide advertisement insertion technology for multichannel video programming distributors (MVPDs), smart television (smart TV manufacturer(s), etc. Such technology enables addressable advertisements targeted to specific viewers, subscribers, households, etc., to be played by set top box devices, smart TVs, etc., over the existing linear television advertisements intended for all recipients (e.g., viewers) of a television broadcast. In the absence of the capability to play addressable advertisements, the underlying linear television advertisements will be presented to those recipients (e.g., viewers).

Figure 1:
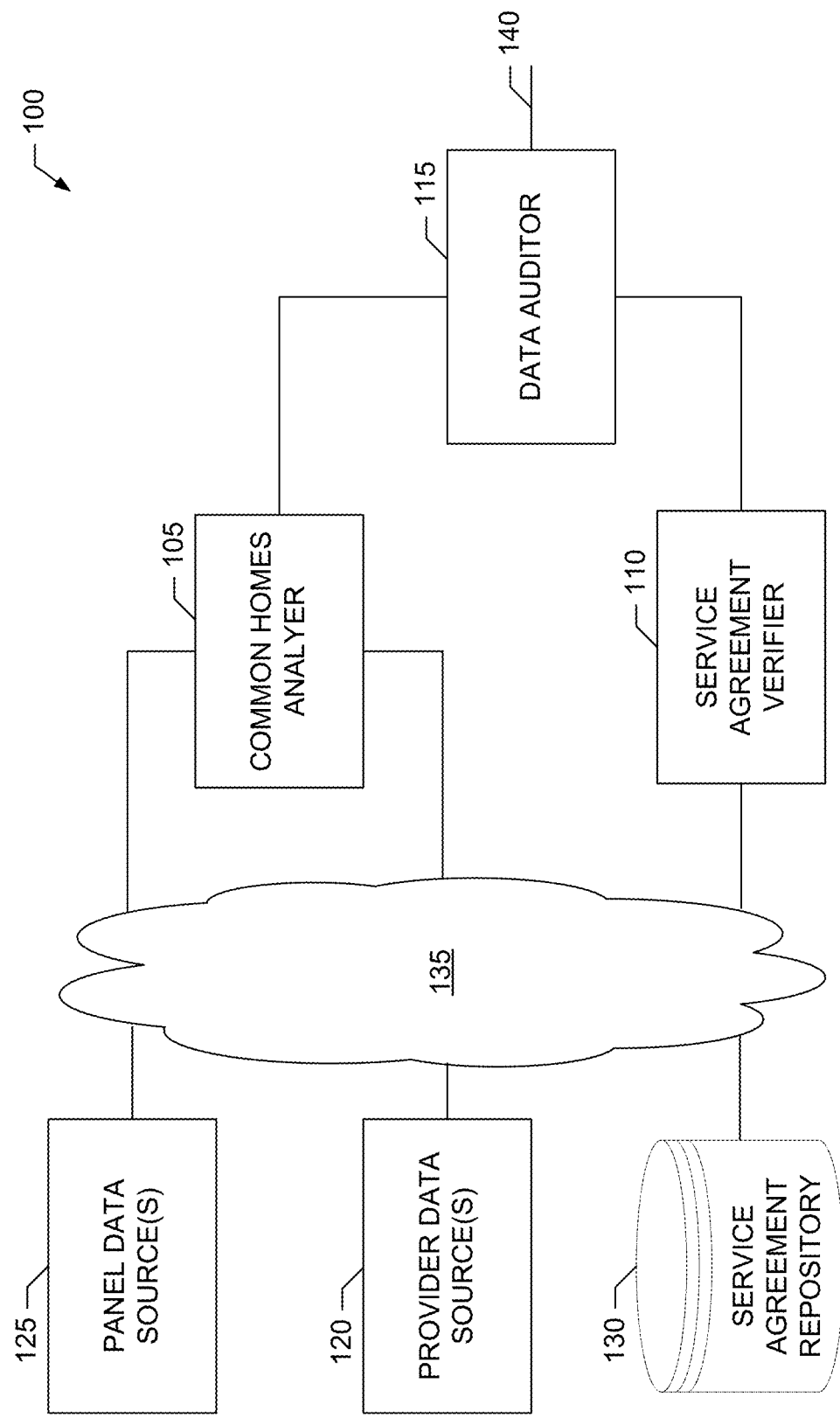
FIG. 1 is a block diagram of an example provider data certification system to implement an addressable measurement framework in accordance with teachings of this disclosure.

The figures are not to scale. In general, the same reference numbers will be used throughout the drawing(s) and accompanying written description to refer to the same or like parts, elements, etc. As used herein, connection references (e.g., attached, coupled, connected, and joined) are to be construed broadly and may include intermediate members between elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used without imputing or otherwise indicating any meaning of priority, physical order or arrangement in a list, and/or ordering in time in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

Example methods, apparatus, systems and articles of manufacture (e.g., physical storage media) to implement an addressable measurement framework are disclosed herein. The Nielsen Company (US), LLC, (also referred to herein as Nielsen) is an audience measurement entity (AME) with a mission and purpose to fuel the media industry with unbiased, representative, reliable data about what people watch and listen. Nielsen measures continuously evolving consumer behavior and provides the currency that underpins billions of dollars in advertising revenue across television, radio and digital.

Innovation in technology is quickly enabling new techniques for reaching consumers, who have numerous options in terms of how, when and on what devices they access media content. Addressable advertising has been used in digital media distribution channels for quite some time, with television traditionally being a device of mass distribution where everyone sees the same advertisement (ad). Technology is now enabling a more customized television experience, with the ability to direct ads to specific audiences via set-top boxes, smart TVs and other smart media devices.

For example, addressable advertisements targeting specific demographic groups are becoming increasingly common in the media landscape. Such addressable advertisements, also referred to as addressable ads, are an important addition to the traditional linear advertisements that advertisers have used for decades. Addressable ad technology allows advertisers to dynamically insert an ad, which targets specific viewers of a program, over an existing linear ad scheduled to air during that program. Viewers who are part of the target demographic groups will see (or be exposed to) the addressable ad, while other viewers will see (or be exposed to) the linear ad. The introduction of addressable ads introduces a need for measurement of both the addressable and linear ad impressions. For example, advertisers and television networks may both need to know how many people viewed (or, more generally, were exposed to) the addressable ad, and how many people viewed (or, more generally, were exposed to) the under-addressable ad.

An addressable commercial provider (ACP) is a company that provides ad insertion technology for MVPDs, smart media devices (e.g., smart TVs), etc., allowing ads intended to target specific viewers to be played by set-top box devices, smart media devices (e.g., smart TVs), etc., over traditional linear TV ads. However, not all markets, networks, and households are addressable-capable. As such, while addressable advertising capability opens the door to new opportunities for reaching a desired audience, care must be taken in ensuring that those audiences are properly measured and represented. Similarly, it is important that the audience receiving a given linear ad is measured and represented accurately.

The "C3/C7" metric on which national television advertisement space is bought and sold is predicated on all households receiving the same linear content and ads. The C3/C7 metric provides the average audience to all national commercials within a given program, inclusive of three (C3) or seven (C7) days of time-shifted viewing. Nielsen's C3/C7 metric measurement is underpinned by a representative panel of television households from which tuning and viewing data is collected. This means an advertiser can be confident that the audience assigned was exposed to the ad as it aired across all relevant distribution channels across the country.

Replacing a linear ad for a subset of the audience with an addressable ad means that the entire audience did not uniformly receive the same ad. As a result, it is important that a reconciliation process exists that accounts for the portion of the audience that was not actually exposed to the linear ad. This can be achieved by integrating more granular viewership and exposure data from the smart TV and set-top box devices to which addressable ads are delivered.

The addressable measurement framework disclosed herein provides mechanisms to align the industry on key tenets to be considered for addressable advertisement measurement, and to define the data and quality requirements to onboard smart TV and set-top box providers. By integrating sources of big data into measurement, the addressable measurement framework disclosed herein is able to reconcile any addressable advertising that exists, unlocking the ability to insert targeted ads during minutes that currently are fully reserved for C3/C7 measurement. In order to maintain the integrity of the measurement, and ensure that buyers and sellers have accurate data to work from, in some examples the existing requirement to serve the same content and same commercials to all homes remains unless the corresponding data set on which targeted, addressable ads will be delivered is certified for measurement.

The addressable measurement framework disclosed herein also provides mechanisms to ingest, evaluate, and ultimately certify data from data providers (e.g., MVPDs, smart TV manufacturers, etc.) for measurement. Once a provider is certified for measurement, addressable advertising can be unlocked on their platform without risk to the fidelity of the C3/C7 national currency measurement.

Further details concerning the certification process of the addressable measurement framework, considerations when evaluating a provider data set, and techniques to make the data usable for addressable ad measurement are disclosed below.

Turning to the figures, a block diagram of an example provider data certification system 100 to implement an addressable measurement framework in accordance with teachings of this disclosure is illustrated in FIG. 1. The example provider data certification system 100 includes an example common homes analyzer 105, an example service agreement verifier 110 and an example data auditor 115. In the illustrated example, the provider data certification system 100 certifies provider data from one or more example provider data source(s) 120 based on panel data provided by one of more panel data source(s) 125 and service level agreement(s) accessed at an example service level agreement repository 130. In the illustrated example, the provider data certification system 100 accesses the provider data source(s) 120, the panel data source(s) 125 and/or the service level agreement repository 130 via an example network 135. The network 135 can be implemented by any number and/or type(s) of data networks, such as one or more wireless networks, one or more wired networks, the Internet, etc., or any combination thereof. The provider data source(s) 120, the panel data source(s) 125 and/or the service level agreement repository 130 can be implemented by any type(s) and/or number(s) of data sources, such as one or more databases, one or more cloud services, one or more servers and/or server farms, etc.

The provider data provided by the provider data source(s) 120 can be automatic content recognition (ACR) data reported by smart media devices, such as smart TVs, associated with one or more smart device/TV manufacturers, return-path data reported by set-top boxes associated with one or more MVPDs, etc. The provider data certification system 100 evaluates provider data associated with a given data source (e.g., given data provider) prior to inclusion in the addressable measurement framework.

For example, the common homes analyzer 105 performs a common homes analysis on provider data associated with a given data provider (e.g., such as ACR data associated with a given smart TV manufacturer, return path data associated with a given MVPD, etc.) based on panel data associated with an audience measurement panel. For example, an AME, such as The Nielsen Company (US), LLC, may reach agreements with pay-television provider companies, such as an MVPD, to obtain the television tuning information derived from set top boxes, which is referred to herein, and in the industry, as return-path data (RPD). Set-top box (STB) data includes some or all the data collected by the set-top box. STB data may include, for example, tuning events and/or commands received by the STB (e.g., power on, power off, change channel, change input source, start presenting media, pause the presentation of media, record a presentation of media, volume up/down, etc.). STB data may additionally or alternatively include commands sent to a content provider by the STB (e.g., switch input sources, record a media presentation, delete a recorded media presentation, the time/date a media presentation was started, the time a media presentation was completed, etc.), heartbeat signals, and/or the like. The set-top box data may additionally or alternatively include a household identification (e.g., a household ID) and/or a STB identification (e.g., a STB ID).

Return path data includes any data receivable at a media service provider (e.g., a such as a cable television service provider, a satellite television service provider, a streaming media service provider, a content provider, etc.) via a return path to the service provider (e.g., MVPD) from a media consumer site. As such, return path data includes at least a portion of the set-top box data. Return path data may additionally or alternatively include data from any other consumer device with network access capabilities (e.g., via a cellular network, the internet, other public or private networks, etc.). For example, return path data may include any or all of linear real time data from an STB, guide user data from a guide server, click stream data, key stream data (e.g., any click on the remote—volume, mute, etc.), interactive activity (such as Video On Demand) and any other data (e.g., data from middleware). RPD data can additionally or alternatively be from the network (e.g., via Switched Digital software) and/or any cloud-based data (such as a remote server DVR) from the cloud.

In contrast, panel data is obtained from AME meters (also referred to herein as media device meters, media meters etc.) that monitor the media presented by the media devices (e.g., televisions) at panelists sites. For example, Nielsen's provides audience measurement metrics (e.g., ratings) based on a representative panel of television households. Nielsen's panels measure homes across a wide array of distribution methods and, thus, include homes from a variety of connected TV manufacturers, MVPDs, smart TV manufacturers, etc. As such, there are homes within the Nielsen panels that have devices that exist within the ACR and/or return-path data sets.

The common homes analyzer 105 of the illustrated example implement a common homes analysis to compare the provider data (e.g., tuning data) collected by a given smart TV, set-top box, etc., to the data captured by the AME meter monitoring the corresponding panel home to identify potential gaps or inconsistencies in the provider data. Nielsen's metered panels are accredited and audited on an annual basis, and used to create currency estimates that have a high degree of accuracy. Thus, such panel data can act as a truth set to which other provider data can be compared by the common homes analyzer 105.

Example metrics evaluated by the common homes analyzer 105 include:

Completeness, which is a metric that represents the extent of missing provider tuning data relative to the truth set represented by the panel data;

Viewing Source, which is a metric that represents likelihood of the proper media sources being credited in the provider data relative to the truth set represented by the panel data;

Viewing Start/End Time, which is a metric that represents the accuracy of the tuning in the provider data being credited to the proper minutes relative to the truth set represented by the panel data;

Credit Time, which is a metric that represents the offset from live tuning (e.g., live, playback via a digital video recorder (DVR+ or other device, etc.);

False Tuning, which a metric that represents invalid tuning events captured in the provider data relative to the truth set represented by the panel data; and/or Proper Indicators, which are metrics that represent whether the provider data properly indicates events such as channel changes, pause events, rewind/fast forward, etc., relative to the truth set represented by the panel data.

In the illustrated example, the common home analyzer 105 uses one or more of the metrics described above to determine a quality of the provider data. For example, the common home analyzer 105 employs one or more modeling techniques, rules, adjustments to account for identified issues in the provider data to remedy such issued prior to integration. In some examples, the common home analyzer 105 determines quality values for the provider data that are associated with respective ones of the metrics described above, and compares those quality values to corresponding quality thresholds associated with the respective ones of the metrics. In some example, the provider data must pass the quality threshold for each of the metrics in order to be certified for measurement, thereby demonstrating accuracy at the subminute (commercial) level. In some examples, the common home analyzer 105 performs an ongoing common homes analyses that is conducted post integration in order to ensure that data quality is maintained.

In some examples, to facilitate the common home analysis performed by the common home analyzer 105, data providers (e.g., MVPDs, smart TV manufacturers, etc.) conduct a blind match with a third party that matches the data providers' existing records (a PII match in the case of MVPDs, an IP address match in the case of smart TV manufacturers, etc.) that allows the common home analyzer 105 to identify which homes within the provider data set are also represented in the panel data. Such a blind match is performed without any personal identification information (PII) data contained in the provider data being made available to the AME.

The service agreement verifier 110 of the illustrated example analyzes a service level agreement (SLA) for a given data provider (e.g., accessed from the service level agreement repository 130) to determine whether the service provider can deliver provider data on a consistent basis and at an agreed upon cadence. The cadence of delivery (e.g., hourly vs. daily) may vary by service provider, but the provider data provided by a service provider is expected be complete and received by the AME by an agreed upon time that allows for consistent data delivery to the industry. In some example, the service agreement verifier 110 provides a mechanism to revise SLAs to meet expected data delivery time(s).

The data auditor 115 of the illustrated example performs an audit of the provider data provided by a given data provider (e.g., MVPD, smart TV manufacturer, etc.) based on the analysis outputs of the common homes analyzer 105 and the service agreement verifier 110. In the illustrated example, the data auditor 115 outputs an example certification indicator 140 for each set of provider data that indicates whether the set of provider data has been certified and can be used in the addressable measurement framework disclosed herein.

Figure 2:
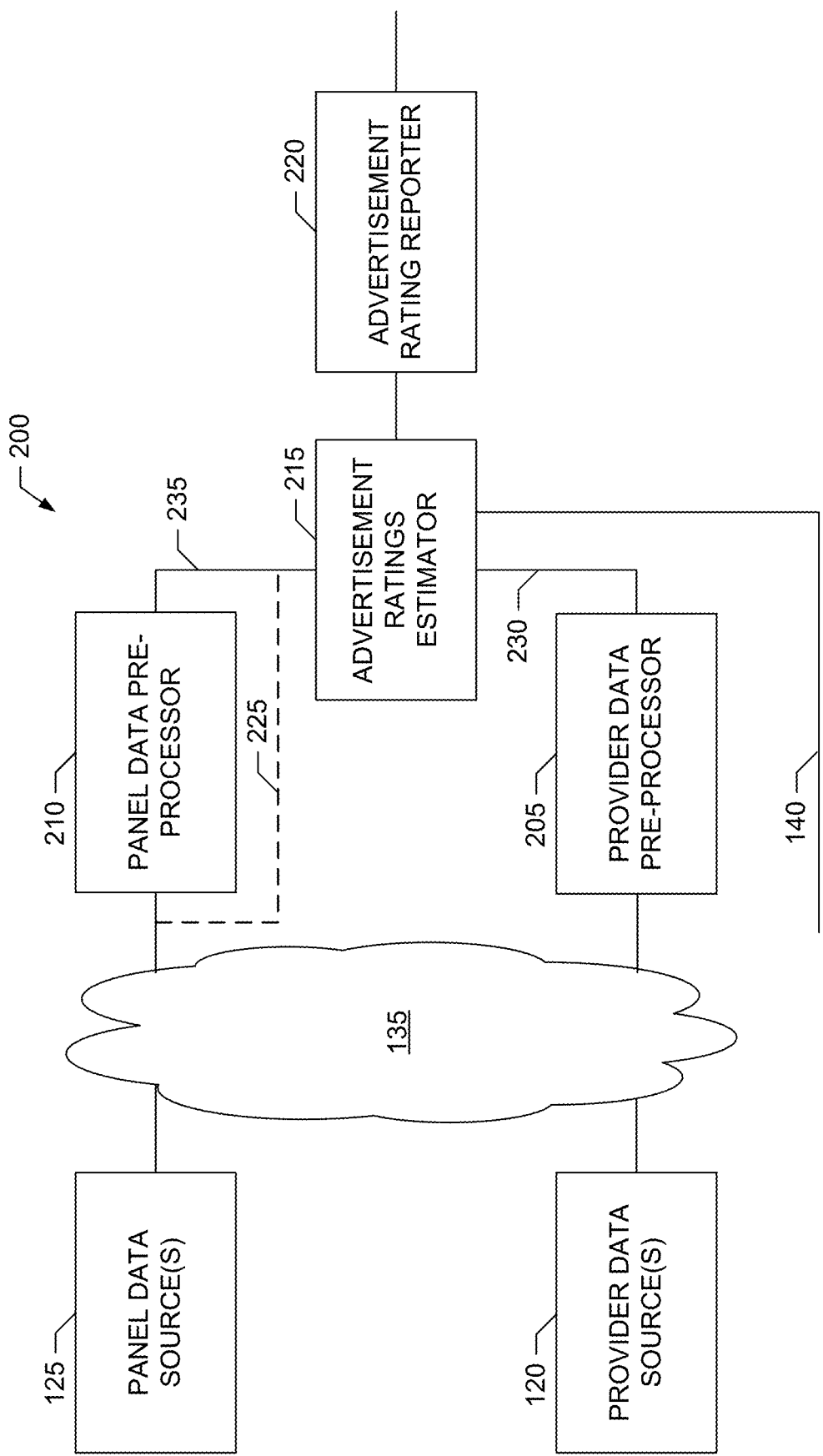
FIG. 2 is a block diagram of an example advertisement measurement system to implement an addressable measurement framework in accordance with teachings of this disclosure.

A block diagram of an example advertisement measurement system 200 to implement an addressable measurement framework implemented in accordance with teachings of this disclosure is illustrated in FIG. 2. In the illustrated example, the advertisement measurement system 200 includes an example provider data pre-processor 205, and example panel data pre-processor 210, an example advertisement ratings estimator 215 and an example advertisement ratings reporter 220. As shown in the illustrated example, the advertisement measurement system 200 utilizes provider data accessed via the network 135 from the one more provider data sources 125, and panel data accessed via the network 135 from the one more panel data sources 125, to estimate and report ratings for addressable advertisements.

The example advertisement measurement system 200 ingest, evaluates and processes provider data from data providers (e.g., MVPDs and/or smart device manufacturers (e.g., smart TV manufacturers)) for purposes of integration into addressable measurement. In some examples, addressable ad insertion during national C3/C7 eligible minutes by devices (e.g., set-top boxes, smart TVs, etc.) associated with a given data provider is not permitted, per policy, until the provider data associated with that given data provider has been certified and integrated into the addressable measurement framework. In some such examples, addressable insertions on unmeasured and uncertified platforms are expected to be isolated to durations that do not contribute to C3/C7 measurement, such as the local advertisement time slots (e.g., 2 minutes of local commercial time).

In some examples, the data elements collected by a service provider and made available by the associated provider data source(s) 120 for addressable measurement include device reference data, tuning data and ad exposure data. Please note that the requirements may vary by provider and technology.

In some examples, the device reference data includes a persistent, unique identifier for each device (e.g., STB, smart TV, etc.) represented in the provide data set. In some examples, opt-out devices/households are removed from the device reference data prior to it being included in the provider data set and sent to the advertisement measurement system 200. In some examples, counts of opt-out devices are tracked in the device reference data and shared to understand the bias this may bring to the dataset, and that is to be accounted for by the advertisement measurement system 200. In some examples, the device reference data includes geographical information about the devices (e.g., Federal Information Processing Standards (FIPS) county, zip code, etc.). In some examples, device make/model information and software version information are included in the device reference data.

In some examples, the tuning data includes tuning events that allow for continuous identification of what is being presented on the device. In some example, the tuning events include a unique, persistent channel identifier (e.g., a Gracenote ID or similar) that allows the media source to be identified at the individual feed level. In some examples, the tuning events are tied to a particular device, using the persistent unique identifiers in the device reference data. In some examples, the tuning data includes indicators for device level (STB/Smart TV) turn-on/turn-off events. In some examples, the tuning data includes indications of both the time the content is presented as well as its offset from live time (e.g., record time vs. playback time). In some examples, the tuning events include/account for special features available on the device, such as pause events, fast forward, rewind, etc.

In some examples, the ad exposure data clearly identifies the ad(s) tuned on a given device represented in the provider data. In some examples, the ad exposure data indicates if a particular tuned ad was linear or addressable. In some example, the ad exposure data identifies the campaign, brand, creative, etc., associated with a particular ad. In some examples, the ad exposure data aligns with the associated tuning data, thereby allowing for the proper assignment of the media source, presentation time and original air time of a particular tuned ad.

Figure 3:
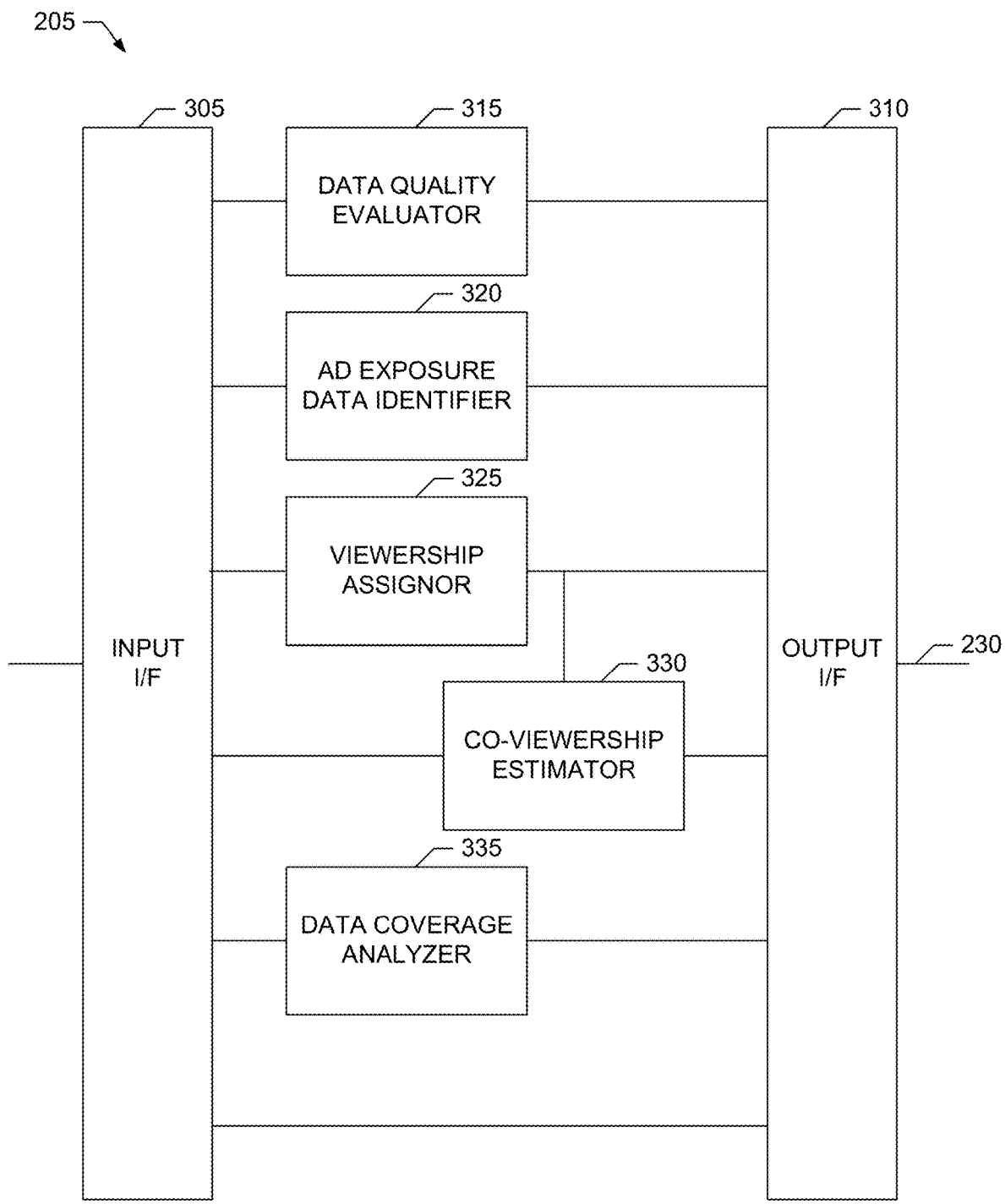
FIG. 3 is a block diagram of an example provider data pre-processor that may be used to implement the example advertisement measurement system of FIG. 2.

An example implementation of the provider data pre-processor 205 included in the advertisement measurement system 200 of FIG. 2 is illustrated in FIG. 3. The example provider data pre-processor 205 of FIG. 3 includes an example input interface 305, an example output interface 310, and example data quality evaluator 315, an example ad exposure data identifier 320, an example viewership assignor 325, an example co-viewership estimator 330 and an example data coverage analyzer 335. In the illustrated example, the input interface 305 can be implemented by any data interface, function call, data structure, etc., capable of accessing the panel data from the panel data source(s) 125 and/or the provider data from the provider data source(s) 120. In the illustrated example, the output interface 310 can be implemented by any data interface, function call, data structure, etc., capable of outputting example pre-processed provider data 230, which is described in further detail below.

The data quality evaluator 315 of the illustrated example evaluates data quality of a given set of provider data to be used for addressable measurement. For example, to ensure a consistent level of quality and accuracy of the data capture to be used to inform the estimates for C3/C7, the data quality evaluator 315 evaluates data quality across the various data provider source(s) 120 that will be used to serve addressable advertising (e.g., ACR data for Smart TVs, and RPD for set top boxes, etc.). In some examples, the data quality evaluator 315 implements a common homes analyzer, which may be similar or identical to the common homes analyzer 205, to leverage panel data, such as Nielsen's accredited panel data, obtained from panel meters, to identify any deficiencies in the provider data and associated corrections to be made to make the provider data usable for currency measurement.

In some examples, the data quality evaluator 315 also determines the granularity of measurement supported by a given set of provider data. For example, the data quality evaluator 315 what the level of granularity that a given provider data source (e.g., ACR data, RPD, etc.) can capture (sub-second, second level, minute level, etc.) and what the accuracy of capture is at each of these levels of measurement. In some examples, addressable measurement relies on precision at the subminute level, which allows for the accurate reporting of audience data at the individual commercial level.

In some examples, the data quality evaluator 315 also determines the quality of data capture supported by a given set of provider data. For example, based on a common homes analysis, the quality and precision of the different provider devices (smart TVs, STBs) associated with different types of provider data may be determined to vary by manufacturer/provider. With the focus here on commercial level ad replacement, the data quality evaluator 315 may evaluate whether the quality of data capture supported by a given set of provider data is sufficient to capture the exact ad correctly. For example, the data quality evaluator 315 may evaluate a given set of provider data to assess:

(i) accuracy of the original credit time for time-shifted viewing and video on demand events;

(ii) variations in data quality by cable/telco/satellite box type and smart TV model and/or version of the ACR software;

(iii) incorrect mapping of media sources to tuning data that results in misattribution of commercial and/or program impressions;

(iv) missing tuning;

(v) false tuning (e.g., associated with machine-generated events, such as software upgrades or other machine events);

(vi) non-viewable tuning events (e.g., such as when the TV set off, but the STB device is on and reporting RPD); and/or (vi) time offset issues that result in incorrect ad and program impressions.

Analyses have shown that the foregoing types of differences between provider data sets can impact the number of impressions for each ad. For example, if the offset from live tuning is incorrect, viewing may be attributed to the wrong program or wrong commercial. Similarly, missing tuning can artificially deflate audience estimates. As such, the data quality evaluator 315 operates to identify such data capture issues and adjust/correct them.

In some examples, the data quality evaluator 315 also determines the usability of a given set of provider data. For example, the common homes analysis performed by the data quality evaluator 315 can determine whether provider data at the individual device level is usable for measurement. If there is a significant amount of tuning missing, for example, from a given set top box or smart TV device, and those devices were included in the addressable measurement, then their associated provider data would artificially depress the ratings. In addition, if the data quality evaluator 315 determines most or all set top boxes or smart TV devices display anomalous behavior during a given day or time period, then the data quality evaluator 315 may indicate that none of the associated provider data is usable for the given day or time period. In some examples, the data quality evaluator 315 determines the efficacy of the tuning collected in the provider data on a daily basis and ensures that only smart TV devices and/or RPD capable set-top boxes with high quality data are included in the addressable measurement.

In some examples, the data quality evaluator 315 operates to mitigate known technology limitations of specific provider devices. For examples, both STBs and smart TVs have known technology limitations that can affect addressable measurement. In some examples, with cable/telco/satellite set top boxes, the RPS is able to identify whether the set top box is on or off, but not whether the connected TV or other media device is on or off (with some exceptions). This directly impacts the viewability of the ad as there can be tuning coming through the set top box when the TV set is off and no one is being exposed to the ads or content. Such minutes are removed by the data quality evaluator 315 from the STB data for both addressable and linear measurement. In some examples, the data quality evaluator 315 implements a machine learning algorithm trained to determine when a TV set is on and off based on the RPD reported by the STB connected to it. This algorithm learns based on behaviors and patterns in the panel data that is collected by the panel meters when the TV sets coupled to the STBs for each provider are on and off, and then a properly trained, unique algorithm is applied to each STB provider.

Also, in some examples, a cable/telco/satellite provider may have some set top boxes that are not return path capable. Such a set top box can receive programming and content from the cable provider, but the set top box does not have the functionality to return data to the provider for inclusion in measurement. This may vary by set top box type and/or geographic location, creating a bias of the types of homes in which data capture occurs (e.g., causing high income to be over-represented relative to low-income homes). In some examples, data quality evaluator 315 processed the provider data to identify whether set top boxes that are not return path capable are under-represented in the provider data, and the extent to which such under-represented set-top boxes make up the provider's footprint.

In the context of smart TVs, ACR technology captures data returned from each Smart TV set, usually at the sub-second level. However, the smart TV requires an Internet connection in order to transmit the ACR data back to the manufacturer. This usually happens in real time, though some sets may have cache functionality to return ACR data on a time delay. One of the challenges is that not all smart TVs are connected to the Internet and/or have opted in to have their data collected by the manufacturer, hence their tuning behaviors are not known or directly measured. Also, some smart TVs are only connected periodically or will lose a connection. This will result in missing tuning information for the smart TV and, if included in addressable measurement processing, would artificially lower the ratings. In some examples, the data quality evaluator 315 utilizes rules to identify and exclude smart TV with Internet connectivity issues from measurement.

Another potential limitation of smart TV data capture is the ability to collect all tuning on the smart TV. Today, many manufacturers do not collect or share tuning that occurs on some native apps, such as Netflix®. From a measurement perspective, this will result in the smart TV appearing off when such apps are used, thus impacting the overall count of the smart TV to include in the addressable measurement. In some examples, the data quality evaluator 315 utilizes rules to identify native app usage on smart TVs.

In some examples, for both smart TV ACR data and STB RPD, the data quality evaluator 315 performs additional filtering to exclude nonresidential devices. Both cable/telco/satellite boxes and smart TVs can be located in places such as businesses or vacation homes that are not currently included in a Household TV Universe definition employed for addressable measurement. The data quality evaluator 315 detects such devices represented in the provider data and filters out their associated contribution to the provider data based on location and/or algorithmically.

In some examples, the data quality evaluator 315 also maps mart TVs and/or other smart devices to households. Brand loyalty varies by household, and thus some households may have multiple smart TV sets from the same manufacturer or different manufacturers. Such information is not directly collected by the manufacturer since there is no installation process like there is with panel meters and a provider cable/satellite set top box. In some examples, the data quality evaluator 315 utilizes one or more rules to map smart TV devices to households, as appropriate.

In the illustrated example, the ad exposure data identifier 320 of the provider data pre-processor 205 identifies addressable advertisement impressions represented in the provider data. In some examples, the ad exposure data identifier 320 uses one or more thresholds to determine whether an addressable advertisement impression represented in the provider data is a valid addressable advertisement impression. Such threshold(s) can help reconcile what counts as a served addressable ad across different media device platforms (e.g., STBs, smart TVs, etc.). For example, the ad exposure data identifier 320 may employ one of more of a duration threshold that defines a minimum duration that an ad must be presented to be counted as a valid addressable ad impression, a proportion threshold that defines a minimum proportion of the ad relative to its entire duration that must be presented to be counted as a valid addressable ad impression, etc. For example, if a set top box is served an addressable ad but the channel is changed 2 seconds into the ad, the ad exposure data identifier 320 will not count that ad as a valid addressable ad impression if the duration threshold is 6 seconds. In some examples, different thresholds are defined for smart TV vs. STB addressable ads. This issue does become more complicated for STB devices since the device being served the ad (cable/satellite box) has no understanding if the device the ad is viewed on (e.g., the actual TV glass screen) is on or off. Therefore, the TV on/off determinations made by the data quality evaluator 315 can help measure ad serving correctly.

As such, the ad exposure data identifier 320 and, more generally, the provider data pre-processor 205 are examples of means for identifying addressable advertisement impressions represented in the provider data.

In the illustrated example, the viewership assignor 325 of the provider data pre-processor 205 determines and assigns household demographics and viewers to the provider data. In some examples, cable/telco/satellite set top boxes (STB) and smart TVs do not directly collect information about who lives in the home or what members of the household are viewing at any given time. Not knowing the demographics, and/or having inaccurate demographics of each addressable household member, can cause challenges to both the targeting and measurement of addressable advertising.

In contrast, the panel meters used to obtain the panel data capture a large, detailed set of demographics for each household and the persons within the household. These characteristics include demographic information such as race, ethnicity, age, gender, etc. These attributes are verified and updated on a regular basis.

One way to assign demographics of the household for both STB and smart TV provider data is via a third-party provider by matching on some sort of identifier (e.g., physical address, network (Internet Protocol—IP) address, etc.). However, it has been observed that third party provider may not provide any household demographic information for 15-50% of all homes/devices (which varies based on matching source). Also, among the homes where the third-party provider could supply household demographic information, the accuracy rates varied by household characteristics. One analysis found that younger households, non-white households, and presence of children are most frequently misidentified. In addition, there may be household members in the home that are not identified at all.

To correctly measure advertising via STB and smart TV devices, the household demographic data is expected to be complete and accurate. Based on the observations above, the data from third party providers does not meet the quality level required to use this as the only source of household demographics.

Figure 11:
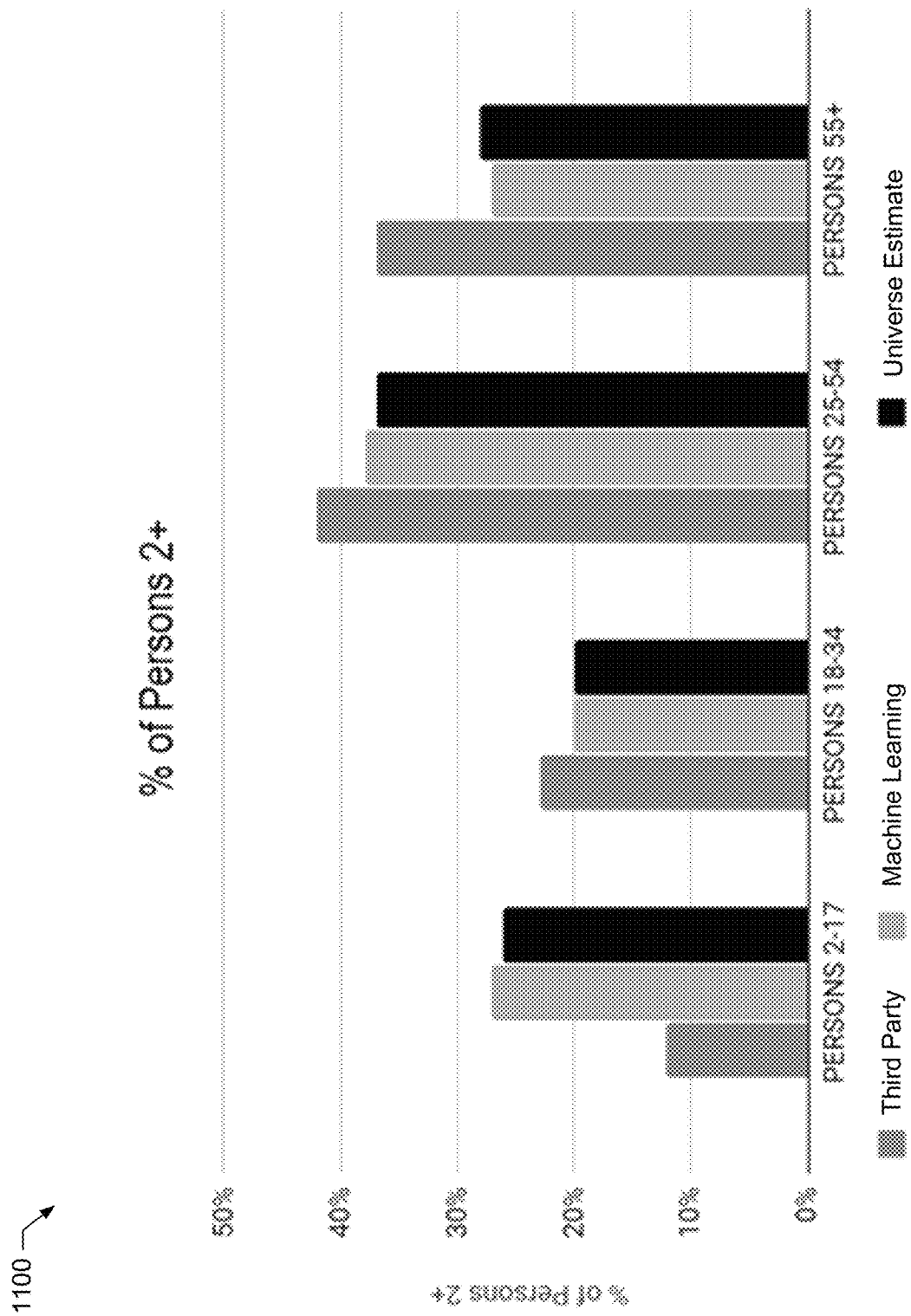
FIG. 11 illustrates example demographic assignments determined by the example advertisement measurement system of FIGS. 2-4.

Therefore, the viewership assignor 325 employs a machine learning technique to assign demographics for each household by predicting the household demographics based on the panel data provided by the panel meters. The machine learning algorithm is trained on the tuning and demographics from the panel data and applied to the STB and smart TV data sources. Validation experiments have shown that such a machine learning technique better assigns household demographics when compared to using only third-party provider data, as shown in FIG. 11. FIG. 11 includes an example graph 1100 in which, for each demographic category, the leftmost bar represents the corresponding demographic composition estimated by the third-party technique mentioned above, the middle bar represents the corresponding demographic composition estimated by machine learning technique employed by the viewership assignor 325, and the rightmost bar represents the true demographic composition for that category.

In the illustrated example, the co-viewership estimator 330 of the provider data pre-processor 205 estimates co-viewing represented by the provider data. Beyond understanding the demographics of the home, it may be important to determine who is viewing the content at any given point in time. If there are multiple people in a household, determining who is viewing the content also involves determining whether more than one person is viewing the content and, if so, which combination of possible people are viewing the content. Without this information, it may be difficult to determine accurate audience counts/impressions for a given program/ad.

AME panels are able to capture this information by having panelists "check in and check out" when they are in the audience for each TV set in the home (such as via Nielsen's People Meter). This technique works when panel meters are used for measurement. The co-viewership estimator 330 utilizes a machine learning demographic assignment technique that leverages panel data for ascribing co-viewing demographics.

In the illustrated example, the machine learning demographic assignment algorithm used by the co-viewership estimator 330 is trained on panel data to model the probabilities for each household member as a viewer for every tuning minute. Based on this technique, the viewers for each tuning minute are determined. Neither STBs nor smart TVs are currently able to capture who is in the audience. The machine learning demographic assignment algorithm employed by the -viewership estimator 330 processes the provider data to predict viewers (and their associated demographics) for each tuning minute.

In the illustrated example, the data coverage analyzer 335 of the provider data pre-processor 205 determines the coverage and representation of device level data included in the provider data. Measuring addressable and linear advertising (e.g., at a national level) in accordance with the disclosed addressable measurement framework involves integration of the STB and smart TV provider data into audience measurement techniques based on projection of panel data. To reflect the audiences appropriately, the data coverage analyzer 335 determines the coverage of each of the available provider data sources 120, including what each provider data source can represent. Today Nielsen has a nationally representative panel that measures the Total US TV Household Universe and all relevant distribution channels. Our sampling frame and recruitment techniques ensure coverage of the total population, (demographics, race, ethnicity, etc.) in our metered panel.

To facilitate integration of STB and smart TV data with the panel data, the data coverage analyzer 335 determines what each of these data assets can represent and what their coverage is. In some examples, the analyses differ between STB and smart TV providers. In some examples, for each of these types of provider data sources, the data coverage analyzer 335 determines: a) what is the coverage of the particular provider data source? b) what can the particular provider data source represent?

For example, for each STB provider data source, the data coverage analyzer 335 determines:

(a)(i) What is the total national coverage of the STB provider data source?

(a)(ii) What is the return path data (RPD) capable opted-in footprint of the STB provider data source?

As an example, consider an STB Provider A that may cover 13% of total national (e.g., US) households, but with a return path capable footprint of 8%.

For a STB to provide tuning data for addressable measurement, it should be return path capable, which means the cable/telco/satellite STB can both receive content from the cable/telco/satellite provider as well as send tuning information back to the provider. Some STB types and/or geographies may not have cable/telco/satellite boxes that are capable of reporting RPD with tuning information. RPD support may also vary with cable/telco/satellite provider.

Thus, the data coverage analyzer 335 assesses what a given set of STB provider data can represent. For example, for each STB provider, the data coverage analyzer 335 determines:

(b)(i) Can the provider data for a given STB provider (e.g., MVPD) represent any other STB providers (MVPD)? For example, can one satellite provider also be projected to represent another satellite provider?

(b)(ii) Can the return path capable footprint represented in the provider data set also represent the non-return path capable homes footprint associated with that provider?

(b)(iii) Can the return path capable STBs represented in the provider data set also represent the non-return path capable STBs associated with that provider?

To answer each of these questions, the data coverage analyzer 335 implements a common homes analyzer, which may be similar or identical to the common homes analyzer 105, to perform a common home analysis to compare the STB provider data with the panel data for the same STBs to determine if there are significant and/or meaningful biases or differences between different segments of the STB provider data. For example, consider a common home analysis that shows STB provider data for Provider A in the previous example has significant differences in the time and type of tuning among return path capable sets represented in the provider data when compared to non-return path capable sets for that same provider represented in the panel data. Based on that common homes analysis, the data coverage analyzer 335 may determine that the provider data from Provider A in this example should be used to represent just Provider A's return path capable homes and STBs. As a result, the data coverage analyzer 335 determines Provider A's total national coverage as 8% (corresponding to the return path capable footprint of 8% in the previous example) versus 13% (corresponding to the total coverage for Provider A in the previous example). The data coverage determinations made by the data coverage analyzer 335 are used to integrate and weight this provider data in the addressable advertisement ratings measurements to ensure all consumer segments are fully and accurately represented in the audience estimates.

For smart TV provider data, the data coverage analyzer 335 performs a slightly different set of analyses. For example, for each smart TV provider data source (e.g., smart TV manufacturer), the data coverage analyzer 335 determines:

For each smart TV manufacturer or provider we answer the following questions:

(a)(i) What is the total national coverage of the smart TV provider data source?

(a)(ii) What is the Internet connected and opted-in footprint of the STB provider data source?

As an example, consider a smart TV manufacturer B that may cover 16% of total national (e.g., US) households, but with an Internet connected opted in footprint of 13.8%.

For a smart TV to provide tuning data for addressable measurement, it should be Internet connected, which means the smart TV can send tuning and diagnostic information back to the manufacturer. However, some homes may not have Internet or connect their smart TV Set to the Internet. Also, some homes may opt out of having ACR data collected by their smart TV and shared with the manufacturer. Thus, the Internet connected opted in footprint may vary by smart TV manufacturer.

Thus, the data coverage analyzer 335 assesses what a given set of mart TV provider data can represent. For example, for each smart TV manufacturer, the data coverage analyzer 335 determines:

(b)(i) Can the provider data for a given smart TV manufacturer represent any other manufacturers?

(b)(ii) Can the Internet connected homes represented in the provider data for a given smart TV manufacturer also represent the non-Internet connected homes for that same smart TV manufacturer?

(b)(iii) Can the opted in homes represented in the provider data for a given smart TV manufacturer also represent the homes that opt out for that same smart TV manufacturer?

(b)(iv) Can the smart TV sets represented in the provider data for a given smart TV manufacturer also represent the non-smart TV sets in the same homes?

To answer each of these questions, the data coverage analyzer 335 implements a common homes analyzer, which may be similar or identical to the common homes analyzer 205, to perform a common home analysis to compare the smart TV provider data with the panel data for the same smart TVs to determine if there are significant and/or meaningful biases or differences between different segments of the smart TV provider data. For example, consider a common home analysis that shows provider data for smart TV manufacturer B shows significant differences in the time and type of tuning among Internet connected smart TV sets when compared to non-Internet connected sets for that same manufacturer represented in the panel data. Based on that common homes analysis, the data coverage analyzer 335 may determine that the provider data from smart TV manufacturer B may represent the Internet connected sets/homes, but should not be used to represent the non-Internet connected sets/homes associated with that manufacturer. As a result, the data coverage analyzer 335 determines smart TV manufacturer B's total national coverage as 13.8% (corresponding to the Internet connected opted in footprint of 13.8% in the previous example) versus 16% (corresponding to the total coverage for smart TV manufacturer B in the previous example). As another example, a common home analysis by the data coverage analyzer 335 may show that the provider data from smart TV manufacturer B can represent its own internet connected, opted in and opted out homes and sets, but not non-smart TV sets. As described above, the data coverage determinations made by the data coverage analyzer 335 are used to integrate and weight this provider data in the addressable advertisement ratings measurements to ensure all consumer segments are fully and accurately represented in the audience estimates.

As such, the data coverage analyzer 335 and more generally, the provider data pre-processor 205 are example of means for performing a common homes analysis of provider data and panel data to determine a coverage footprint associated with the provider data. In some examples, the provider data used to perform the common homes analysis includes at least one of return path data reported by a plurality of set-top boxes or automatic content recognition data reported by a plurality of smart media devices, and the panel data used to perform the common homes analysis is reported by media device meters. In some examples in which the provider data includes the return path data reported by a plurality of set-top boxes, the data coverage analyzer 335 and more generally, the provider data pre-processor 205 are example of means for analyzing the provider data to identify a first portion of the provider data corresponding to a first portion of the coverage footprint associated with first ones of the set top boxes that are return path data capable, analyzing the provider data to identify a second portion of the provider data corresponding to a second portion of the coverage footprint associated with second ones of the set top boxes that are not return path data capable, and comparing the first portion of the provider data with a portion of the panel data to determine whether the first portion of the provider data is also representative of the second portion of the coverage footprint. In some such examples, the portion of the panel data used for the comparison is also representative of the second portion of the coverage footprint associated with the second ones of the set top boxes that are not return path data capable. In some examples in which the provider data includes the automatic content recognition data reported by a plurality of smart media devices (e.g., smart TVs), the data coverage analyzer 335 and more generally, the provider data pre-processor 205 are example of means for analyzing the provider data to identify a first portion of the provider data corresponding to a first portion of the coverage footprint associated with first ones of the smart media devices that are capable of performing automatic content recognition, analyzing the provider data to identify a second portion of the provider data corresponding to a second portion of the coverage footprint associated with second ones of the smart media devices that are at least one of not network connected or that are not opted in to perform automatic content recognition, and comparing the first portion of the provider data with a portion of the panel data to determine whether the first portion of the provider data is also representative of the second portion of the coverage footprint. In some such examples, the portion of the panel data used for the comparison is also representative of the second portion of the coverage footprint associated with the second ones of the smart media devices that are at least one of not network connected or that are not opted in to perform automatic content recognition.

Returning to FIG. 2, the panel data pre-processor 210 of the advertisement measurement system 200 performs any appropriate pre-processing of the panel data provided by the panel data source(s) 125. In some examples, pre-processing of the panel data is unnecessary and the panel data pre-processor 210 is omitted (which is represented by the dashed line 225 in FIG. 2).

Figure 4:
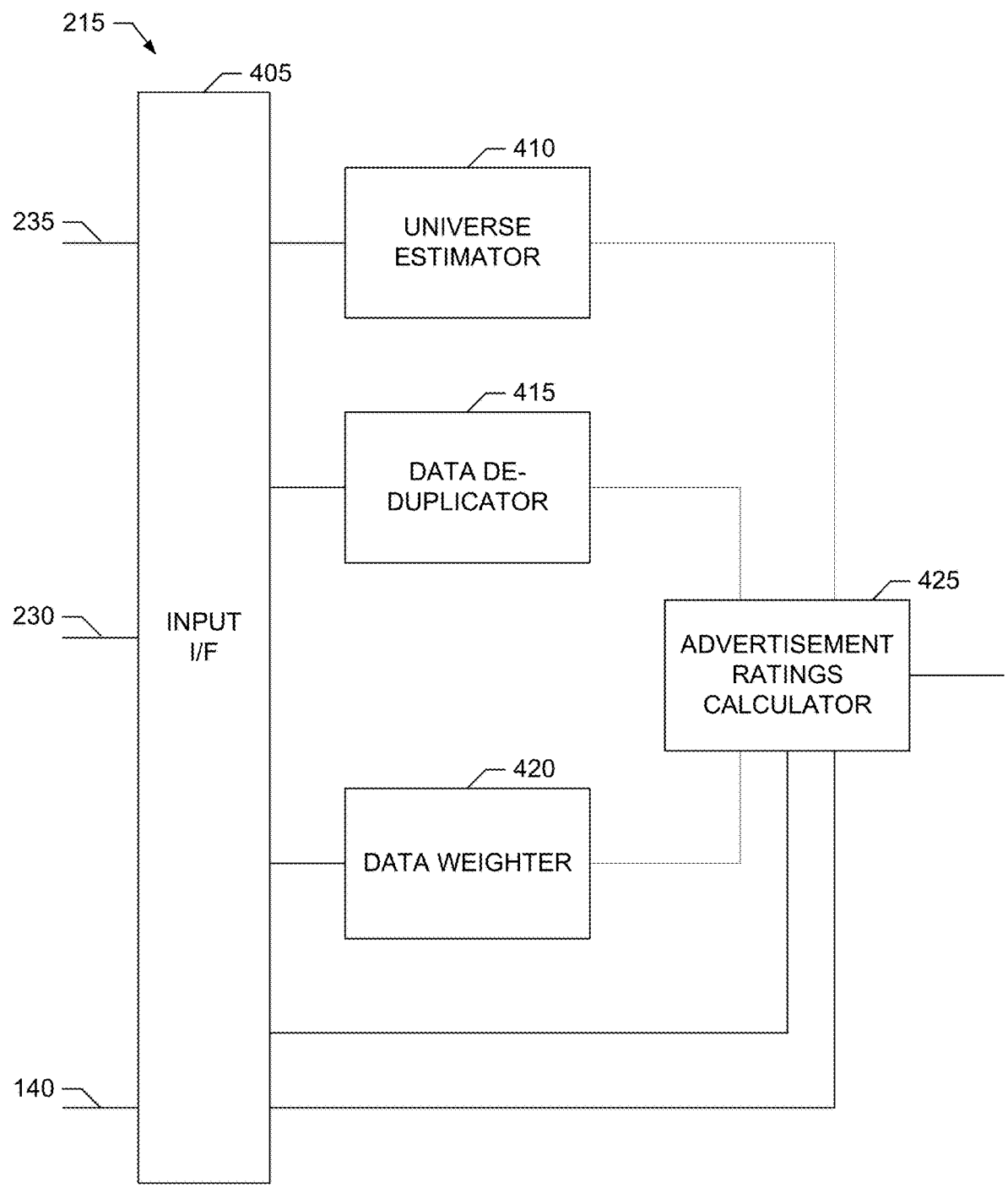
FIG. 4 is a block diagram of an example advertisement ratings estimator that may be used to implement the example advertisement measurement system of FIG. 2.

In the illustrated example of FIG. 2, the advertisement ratings estimator 215 of the advertisement measurement system 200 estimates addressable advertisement ratings based on example pre-processed provider data 230 output from the provider data pre-processor 205 and example panel data 235 (which may be pre-processed by the panel data pre-processor 210). The advertisement ratings estimator 215 also uses the example certification indicator 140 determined by the data certification system 100 for each set of provider data to determine whether that set of provider data can be used for addressable measurement computations. An example implementation of the advertisement ratings estimator 215 is illustrated in FIG. 4. The example advertisement ratings estimator 215 of FIG. 4 includes an example input interface 405, an example universe estimator 410, an example data de-duplicator 415, an example data weighter 420 and an example advertisement ratings calculator 425. In the illustrated example, the input interface 405 can be implemented by any data interface, function call, data structure, etc., capable of accessing the panel data 235, the pre-processed provider data 230 and/or the certification indicator 140.

In the illustrated example, the universe estimator 410 calculates universe estimates representative if the size and characteristics of the total potential audience for which addressable measurements are to be determined. The universe estimator 410 calculates such universe estimates based on the panel data and provider data (e.g., smart TV provider data, STB provider data, etc.) For example, the universe estimator 410 may calculate universe estimates of the number of smart TV devices/households, the number of STB devices/households, etc., in a national footprint (e.g., such as the U.S.). In some examples, the universe estimator 410 may additionally or alternatively calculate other universe estimates for each type of provider, such as other geography-based smart-TV and/or STB universe estimates, ethnicity-based smart-TV and/or STB universe estimates, etc. In some examples, the universe estimator 410 processes a combination of AME data assets and external data sources to calculate accurate universe estimates. As disclosed in further detail below, the panel data and pre-processed provider data, as well as the provider data's coverage/representation (e.g., what data we have) as determined by the data coverage analyzer 335 and the universe estimate(s) (e.g., what target we are projecting to) determined by the universe estimator 410 are utilized to incorporate smart TV and STB provider data into the addressable advertisement measurements.

As described above, the provider data pre-processor 205 outputs pre-processed (e.g., cleaned) provider tuning data 230, with demographics and viewers assigned, and the coverage and representation determined. The pre-processed (e.g., cleaned) provider tuning data 230, along with the universe estimates output by the universe estimator 410 and the panel data 235, are used by the data de-duplicator 415, the data weighter 420 and the advertisement ratings calculator 425 to compute rating and impression estimates for addressable advertisements. In particular, the data de-duplicator 415, the data weighter 420 and the advertisement ratings calculator 425 perform the operations of deduplication, weighting and measurement computations, respectively.

The data de-duplicator 415 of the illustrated example performs de-duplication to remove duplicate records among the panel data 235 and the provider data 230. In some examples, the AME panel data 235 does not have duplication as each panel home is recruited and measured once. However, duplicate records can occur among the panel data 235 and the provider data 230 for several reasons. For example, an AME panel home may have a smart TV and/or STB that is represented in both the AME panel data 235 and the smart TV/STB provider data 235. As another example, suppose the provider data 235 to be integrated includes data from STB provider A and data from smart TV manufacturer J. Some homes will have a cable/satellite STB from STB provider A that is connected to a smart TV from smart TV manufacturer J. As yet a further example, suppose the provider data 235 to be integrated includes data from smart TV manufacturer J and smart TV manufacturer Y, and a household has one of each type of smart TV. In this latter case, de-deduplication involves placing the smart TV devices represented in the disparate data sets in the same household to avoid overstating the ratings measurements. In the foregoing example scenarios, the data de-duplicator 415 removes one of the data records from the multiple provider data sources, or combines the multiple provider data sources, to ensure the same home and/or device is not counted twice in the rating measurements.

In some examples, the data de-duplicator 415 works to take advantage of these the duplicate records contained in multiple provider data sources. For example, the data de-duplicator 415 can use tuning data and/or other information included in a record from one of the provider data sources to supplement a record for a duplicate device/home in another of the provider data sources. As another example, if one of the provider data sources is out of compliance for a measurement interval (e.g., a given day), the data de-duplicator 415 can use a record for a duplicate device/home in another of the provider data sources to provide tuning information to make the device/home compliant for the measurement interval.

The data weighter 420 of the illustrated example applies weighting to the panel data 235 and the pre-processed provider data 230 to project the data to represent a population, such as total national (e.g., U.S.) TV households. The data weighter 420 applies weights to the panel data 235 and the pre-processed provider data 230 to emphasize/deemphasize contributions of different segments of the panel data 235 and the pre-processed provider data 230 to represent target populations (e.g., demographic groups). In some examples, the weighting controls employed by the data weighter 420 are reviewed on an annual basis and updated as appropriate.

In addition to setting the weighting controls, the data weighter 420 also conducts a secondary weighting process to address gaps in the smart TV and/or RPD coverage. For example, and as described above, the data coverage analyzer 335 may identify segments of the population within an STB provider's footprint that the provider's STB data will not be able to represent. Likewise, the data coverage analyzer 335 may identify segments of the population within a smart TV provider's footprint that the provider's smart TV data will not be able to represent. For example, the data coverage analyzer 335 may determine there are substantial differences in tuning data characteristics between return path capable and non-return path capable STBs. Therefore, RPD-capable STBs may not be able to represent non-RPD capable STBs within the same STB provider footprint. In order to ensure coverage of those non-RPD capable STBs, the data weighter 420 may weight the records in the panel data 235 for non-RPD capable STBs within that STB provider's footprint to project the panel data records to represent the non-RPD capable STBs within the provider footprint.

As such, the data weighter 420 and, more generally, the advertisement ratings estimator 215 are examples of means for weighting a portion of the provider data based on the common homes analysis, and weighting a portion of the panel data based on the common homes analysis. In some examples, the data weighter 420 and, more generally, the advertisement ratings estimator 215 weight a portion of the panel data (e.g., corresponding to non-RPD capable STBs within an STB provider's footprint) to represent a given portion of a provider's coverage footprint (e.g., corresponding to non-RPD capable STBs within the STB provider's footprint) when the provider data (e.g., a portion corresponding to RPD capable STBs within the STB provider's footprint) is determined to not be representative of that portion of the provider coverage footprint.

The advertisement ratings calculator 425 of the illustrated example computes impressions and ratings for addressable advertisements in a target population, such as total national (e.g., U.S.) TV households. In some examples, the advertisement ratings calculator 425 checks the certification indicator 140 to determine whether the pre-processed provider data 230 is certified, and if so, integrates the pre-processed provider data 230 with the panel data 235 to calculate advertisement impressions and ratings.

For example, the advertisement ratings calculator 425 may calculate an average commercial minute (ACM) rating, such as the C3/C7 rating described above, based on the average of all of the commercial minutes in a given telecast. As noted above, the C3/C7 measurement assumes the audience is exposed to the same linear ad regardless of distribution source. In order to maintain the integrity of the existing C3/C7 metric, the advertisement ratings calculator 425 removes addressable ad impressions from the computation of the C3/C7 metric. In some examples, the advertisement ratings calculator 425 computes individual exact commercial minutes to isolate and analyze where the addressable ads occur. Such a new calculation takes into account the duration of the addressable and linear ads within the exact minute when calculating the updated commercial impressions and ratings.

In some examples, the advertisement ratings calculator 425 may calculate one or more of the following metrics at the telecast level:

(i) new baseline C3/C7 impressions at the telecast level that integrate panel data and provider data;

(ii) new baseline minute level ad impressions that integrate panel and provider data;

(iii) addressable as impressions at the minute level; and/or (iv) reconciled impressions with addressable exposures removed (e.g., such as a reconciled C3/C7 metric).

As such, the advertisement ratings calculator 425 and, more generally, the advertisement ratings estimator 215, are examples of means for calculating an addressable advertisement rating based on a weighted portion of the provider data and a weighted portion of the panel data. In some examples, the advertisement ratings calculator 425 and, more generally, the advertisement ratings estimator 215, are examples of means for calculating, based on the weighted portion of the provider data and the weighted portion of the panel data, the addressable advertisement rating to represent exposure to the addressable advertisement impressions. In some examples, the advertisement ratings calculator 425 and, more generally, the advertisement ratings estimator 215, are examples of means for removing addressable advertisement impressions from calculation of a linear advertisement rating different from the addressable advertisement rating.

Returning to FIG. 2, the advertisement ratings reporter 220 reports the addressable advertisement measurements (e.g., ratings, impressions, etc.) calculated by the advertisement ratings estimator 215. In some examples, the advertisement ratings reporter 220 reports the addressable advertisement measurements via the network 135 to one or more recipient devices. In some examples, the advertisement ratings reporter 220 additionally or alternatively controls (e.g., directly or indirectly) selection and/or delivery of addressable ads to one or more target devices (e.g., target STBs, target smart TVs, etc.) based on the addressable advertisement measurements.

While example manners of implementing the provider data certification system 100 and the advertisement measurement system 200 are illustrated in FIGS. 1-4, one or more of the elements, processes and/or devices illustrated in FIGS. 1-4 may be combined, divided, re-arranged, omitted, eliminated and/or implemented in any other way. Further, the example common homes analyzer 105, the example service agreement verifier 110, the example data auditor 115, the example provider data pre-processor 205, the example panel data pre-processor 210, the example advertisement ratings estimator 215, the example advertisement ratings reporter 220, the example input interface 305, the example output interface 310, the example data quality evaluator 315, the example ad exposure data identifier 320, the example viewership assignor 325, an example co-viewership estimator 330 and example data coverage analyzer 335, the example input interface 405, the example universe estimator 410, the example data de-duplicator 415, the example data weighter 420, the example advertisement ratings calculator 425 and/or, more generally, the example provider data certification system 100 and/or the example advertisement measurement system 200 may be implemented by hardware, software, firmware and/or any combination of hardware, software and/or firmware. Thus, for example, any of the example common homes analyzer 105, the example service agreement verifier 110, the example data auditor 115, the example provider data pre-processor 205, the example panel data pre-processor 210, the example advertisement ratings estimator 215, the example advertisement ratings reporter 220, the example input interface 305, the example output interface 310, the example data quality evaluator 315, the example ad exposure data identifier 320, the example viewership assignor 325, an example co-viewership estimator 330 and example data coverage analyzer 335, the example input interface 405, the example universe estimator 410, the example data de-duplicator 415, the example data weighter 420, the example advertisement ratings calculator 425 and/or, more generally, the example provider data certification system 100 and/or the example advertisement measurement system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example provider data certification system 100, the example advertisement measurement system 200, the example common homes analyzer 105, the example service agreement verifier 110, the example data auditor 115, the example provider data pre-processor 205, the example panel data pre-processor 210, the example advertisement ratings estimator 215, the example advertisement ratings reporter 220, the example input interface 305, the example output interface 310, the example data quality evaluator 315, the example ad exposure data identifier 320, the example viewership assignor 325, an example co-viewership estimator 330 and example data coverage analyzer 335, the example input interface 405, the example universe estimator 410, the example data de-duplicator 415, the example data weighter 420 and/or the example advertisement ratings calculator 425 is/are hereby expressly defined to include a non-transitory computer readable storage device or storage disk such as a memory, a digital versatile disk (DVD), a compact disk (CD), a Blu-ray disk, etc. including the software and/or firmware. Further still, the example provider data certification system 100 and/or the example advertisement measurement system 200 may include one or more elements, processes and/or devices in addition to, or instead of, those illustrated in FIGS. 1-4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example provider data certification system 100 and/or the example advertisement measurement system 200 are shown in FIGS. 5-8. In these examples, the machine readable instructions may be one or more executable programs or portion(s) of an executable program for execution by a computer processor, such as the processor 912 shown in the example processor platform 900 discussed below in connection with FIG. 9. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor 912, but the entire program or programs and/or parts thereof could alternatively be executed by a device other than the processor 912 and/or embodied in firmware or dedicated hardware. Further, although the example program(s) is(are) described with reference to the flowcharts illustrated in FIGS. 5-8, many other methods of implementing the example under-addressable advertisement measurement system 100 may alternatively be used. For example, with reference to the flowcharts illustrated in FIGS. 5-8, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by a processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 5:
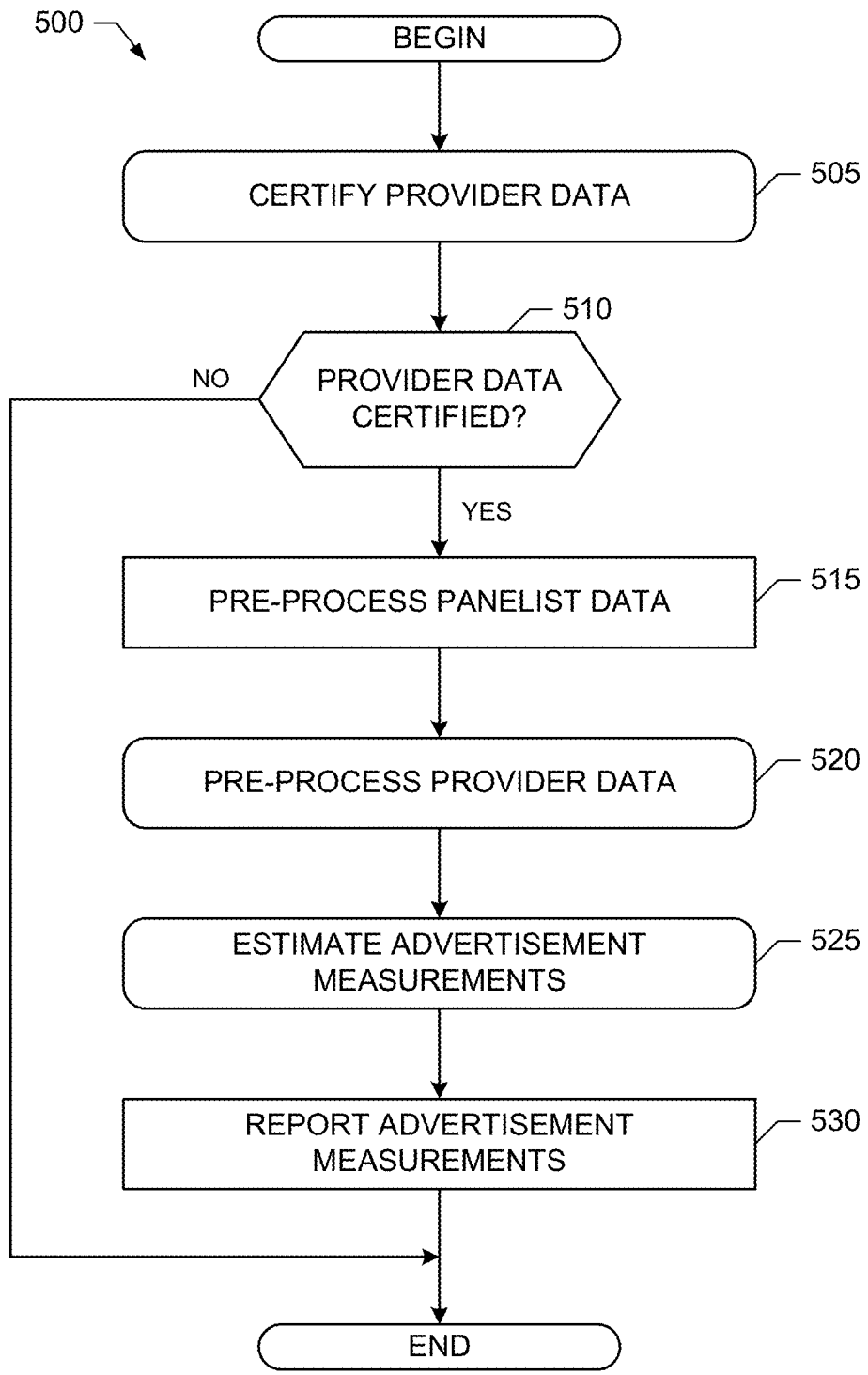
FIG. 5 is a flowchart representative of example machine readable instructions that may be executed to implement the example provider data certification system of FIG. 1 and/or the example advertisement measurement system of FIGS. 2-4.

An example program 500 that may be executed to implement the example provider data certification system 100 and the example advertisement measurement system 200 is represented by the flowchart shown in FIG. 5. With reference to the preceding figures and associated written descriptions, the example program 500 of FIG. 5 begins execution at block 505 at which the provider data certification system 100 certifies one or more sets of provider data obtained from the provider data source(s) 120, as described above. An example program that may be executed to perform the processing at block 505 is illustrated in FIG. 6 and described in further detail below.

Figure 7:
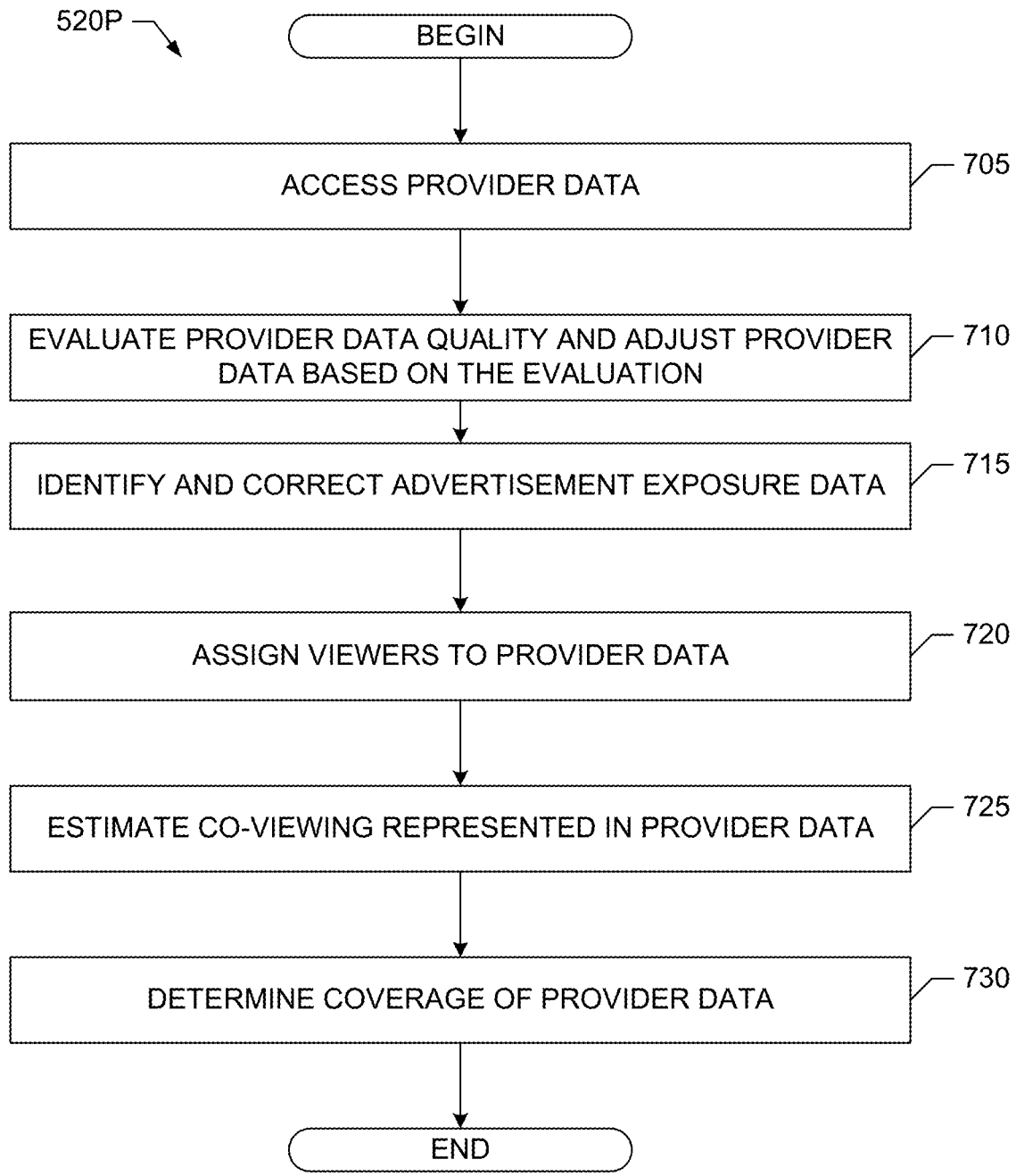
FIG. 7 is a flowchart representative of example machine readable instructions that may be executed to implement the example provider data pre-processor of FIG. 3.
Figure 8:
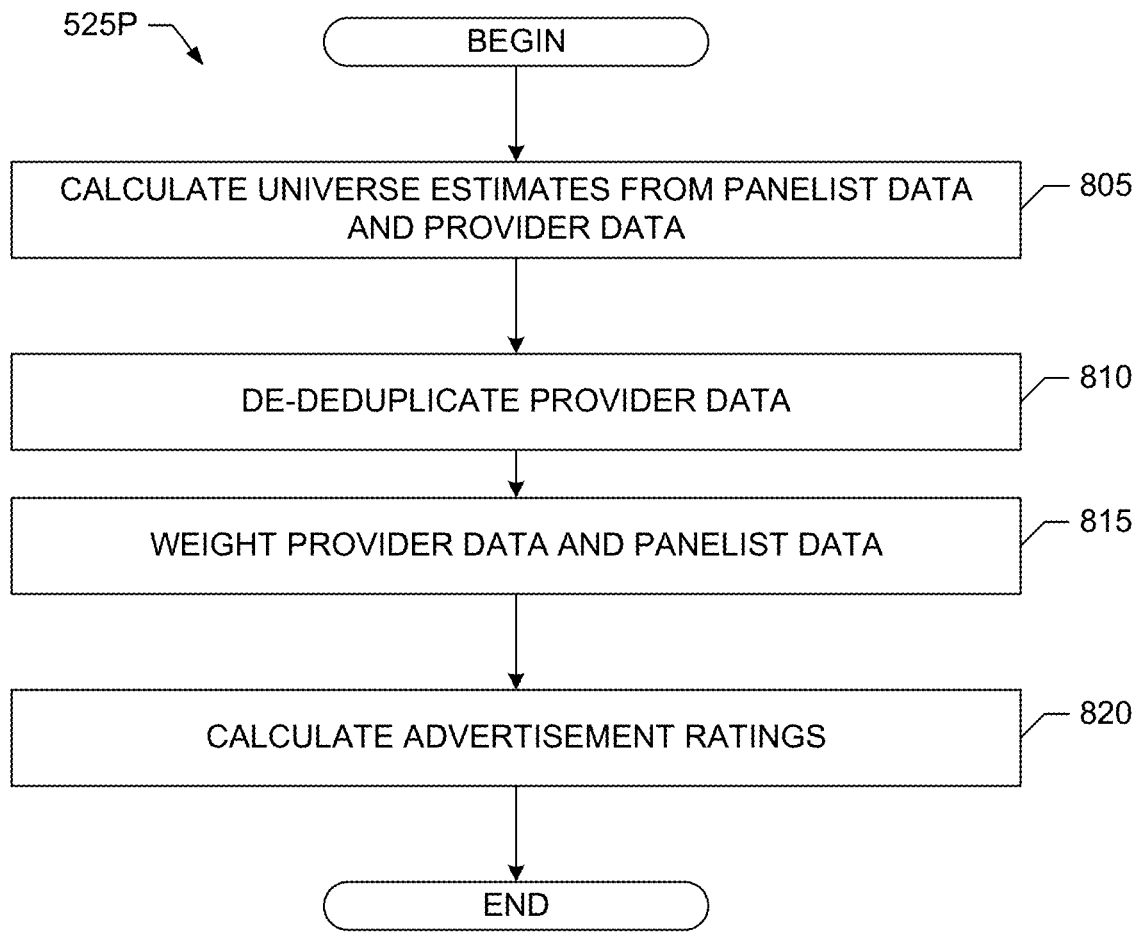
FIG. 8 is a flowchart representative of example machine readable instructions that may be executed to implement the example advertisement ratings estimator of FIG. 4.

At block 510, the provider data certification system 100 outputs one or more example certification indicators 140 to indicate whether the corresponding one or more sets of provider data have been certified, as described above. If one or more of the sets of provider data have been certified, at block 515 the advertisement measurement system 200 performs any appropriate pre-processing of the panel data (e.g., with the panel data pre-processor 210) to be used to determine advertisement measurements (e.g., ratings, impressions, etc.), as described above. At block 520, the advertisement measurement system 200 performs pre-processing of the provider data (e.g., with the provider data pre-processor 205) to be used to determine advertisement measurements (e.g., ratings, impressions, etc.), as described above. An example program that may be executed to perform the processing at block 520 is illustrated in FIG. 7 and described in further detail below. At block 525, the advertisement measurement system 200 estimates advertisement measurements (e.g., with the advertisement ratings estimator 215), which may include addressable ad ratings/impressions, linear ad ratings/impressions, etc., as described above. An example program that may be executed to perform the processing at block 525 is illustrated in FIG. 8 and described in further detail below. At block 530, the advertisement measurement system 200 reports the estimated advertisement measurements (e.g., with the advertisement ratings reporter 220), as described above.

Figure 6:
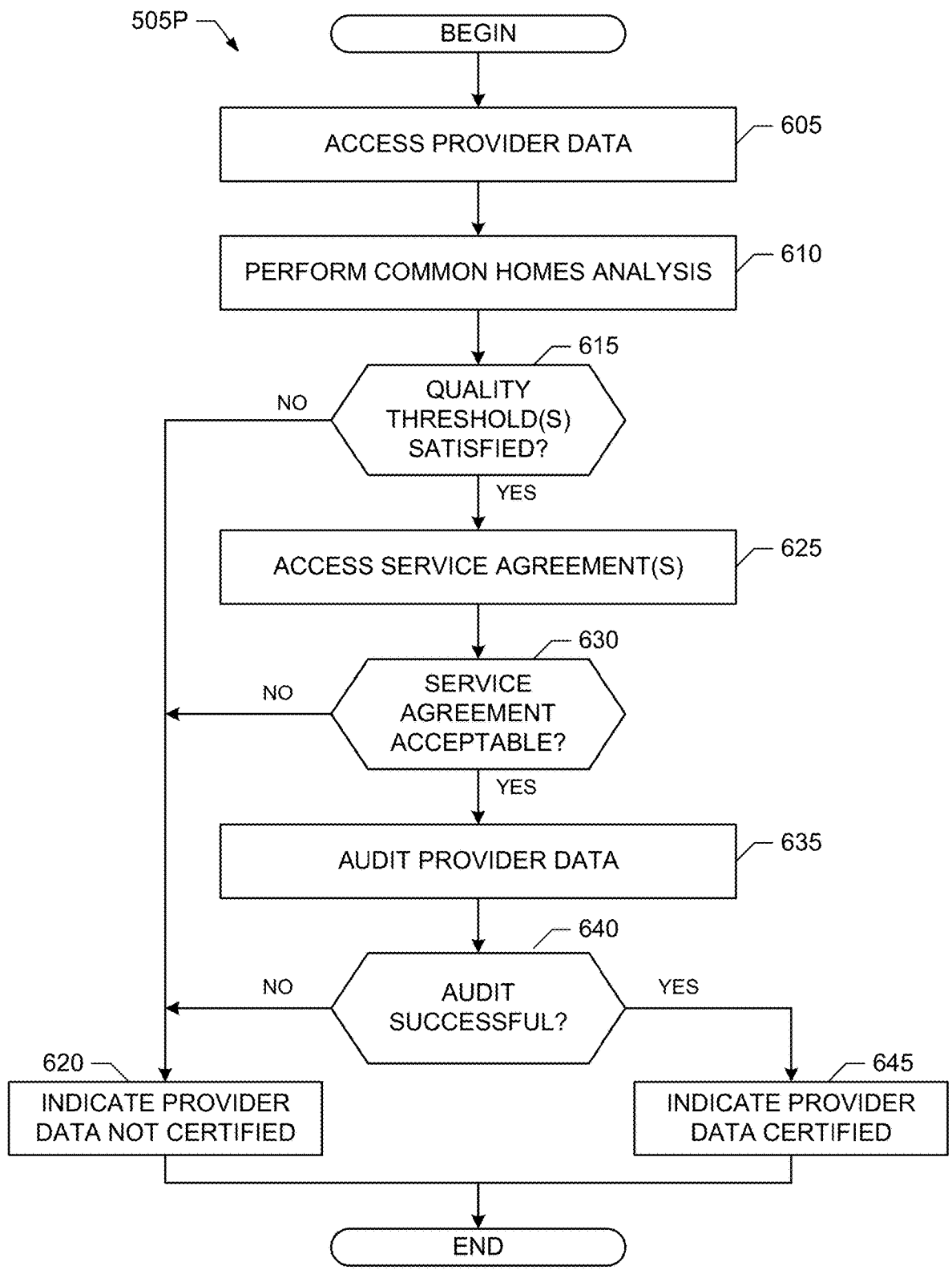
FIG. 6 is a flowchart representative of example machine readable instructions that may be executed to implement the example provider data certification system of FIG. 1.

An example program 505P that may be executed to implement the example provider data certification system 100 and/or to perform the processing at block 505 of FIG. 5 is represented by the flowchart shown in FIG. 6. With reference to the preceding figures and associated written descriptions, the example program 505P of FIG. 6 begins execution at block 605 at which the common homes analyzer 105 accesses provider data to be certified. For example, the common homes analyzer 105 accesses the provider data from the provider data source(s) 120, as described above. At block 610, the common homes analyzer 105 performs a common homes analysis to evaluate the quality of the provider data based on panel data, as described above. At block 615, the common homes analyzer 105 compares the quality if the provider data to one or more quality thresholds, as described. If the quality threshold(s) is(are) not satisfied, at block 620 the common homes analyzer 105 sets the certification indicator 140 for the provider data to indicate the provider data is not certified, as described above.

However, if the quality threshold(s) is(are) satisfied, at block 625 the service agreement verifier 110 accesses one or more service agreements associated with the provider data. For example, the service agreement verifier 110 accesses the service agreement(s) from the service agreement repository 130, as described above. At block 630, the service agreement verifier 110 determines whether the service agreement(s) are acceptable, as described above. If the service agreement(s) are not acceptable, then at block 620 the service agreement verifier 110 sets the certification indicator 140 for the provider data to indicate the provider data is not certified, as described above.

However, if the service agreement(s) are acceptable, at block 635 the data auditor 115 audits the provider data, as described above. If the audit is not successful (block 640), then at block 620 the data auditor 115 sets the certification indicator 140 for the provider data to indicate the provider data is not certified, as described above. However, if the audit is successful (block 640), at block 645 the data auditor 115 sets the certification indicator 140 for the provider data to indicate the provider data is certified, as described above.

An example program 520P that may be executed to implement the example advertisement measurement system 200 and/or to perform the processing at block 520 of FIG. 5 is represented by the flowchart shown in FIG. 7. With reference to the preceding figures and associated written descriptions, the example program 520P of FIG. 7 begins execution at block 705 at which the provider data pre-processor 205 accesses, via the input interface 305, the provider data to be used for addressable measurement calculations, as described above. At block 710, the data quality evaluator 31 evaluates the provider data quality and adjust the provider data based on the evaluation, as described above. At block 715, the ad exposure data identifier 320 identifies and corrects ad exposure data included in the provider data, as described above. At block 720, the viewership assignor 325 assigns viewers to the provider data, as described above. At block 725, the co-viewership estimator 330 estimates co-viewing represented in the provider data, as described above. At block 730, the data coverage analyzer 335 determines the coverage of the provider data, as described above. The outputs of blocks 710-730 are included in the pre-processed provider data 230 output from the provider data pre-processor 205.

An example program 525P that may be executed to implement the example advertisement measurement system 200 and/or to perform the processing at block 525 of FIG. 5 is represented by the flowchart shown in FIG. 8. With reference to the preceding figures and associated written descriptions, the example program 525P of FIG. 8 begins execution at block 805 at which universe estimator 410 calculates universe estimates from panelist data and provider data, as described above/At block 810, the data de-duplicator 415 de-duplicates the provider data and panel data, as described above. At block 815, the data weighter 420 weights the provider data and panel data, as described above. At block 820, the advertisement ratings calculator 425 calculates advertisement measurements, such as addressable ad ratings/impressions, linear ad ratings/impressions, etc., as described above.

Figure 9:
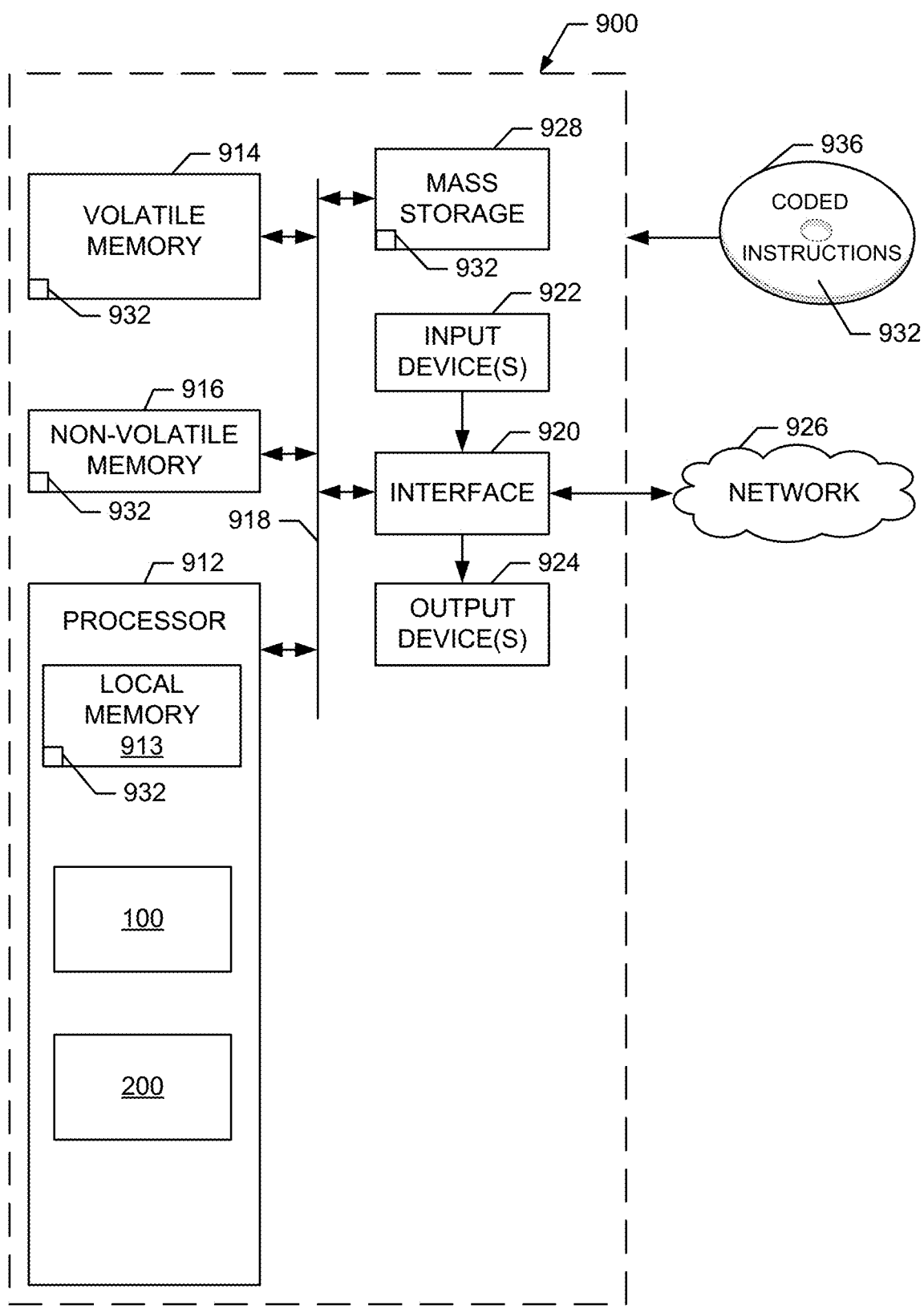
FIG. 9 is a block diagram of an example processor platform structured to execute the example machine readable instructions of FIGS. 5, 6, 7 and/or 8 to implement the example provider data certification system of FIG. 1 and/or the example advertisement measurement system of FIGS. 2-4.

FIG. 9 is a block diagram of an example processor platform 900 structured to execute the instructions of FIGS. 5, 6, 7 and/or 8 to implement the example provider data certification system 100 and/or the example advertisement measurement system 200 of FIGS. 1-4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor 912 may be a semiconductor based (e.g., silicon based) device. In this example, the processor 912 implements the example provider data certification system 100 and the example advertisement measurement system 200. As such, the processor 912 also implements the example common homes analyzer 105, the example service agreement verifier 110, the example data auditor 115, the example provider data pre-processor 205, the example panel data pre-processor 210, the example advertisement ratings estimator 215, the example advertisement ratings reporter 220, the example input interface 305, the example output interface 310, the example data quality evaluator 315, the example ad exposure data identifier 320, the example viewership assignor 325, an example co-viewership estimator 330 and example data coverage analyzer 335, the example input interface 405, the example universe estimator 410, the example data de-duplicator 415, the example data weighter 420 and the example advertisement ratings calculator 425.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, a trackbar, isopoint and/or a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 corresponding to the instructions of FIGS. 6, 7 and/or 8 may be stored in the mass storage device 928, in the volatile memory 914, in the non-volatile memory 916, in the local memory 913 and/or on a removable non-transitory computer readable storage medium, such as a CD or DVD 936.

Figure 10:
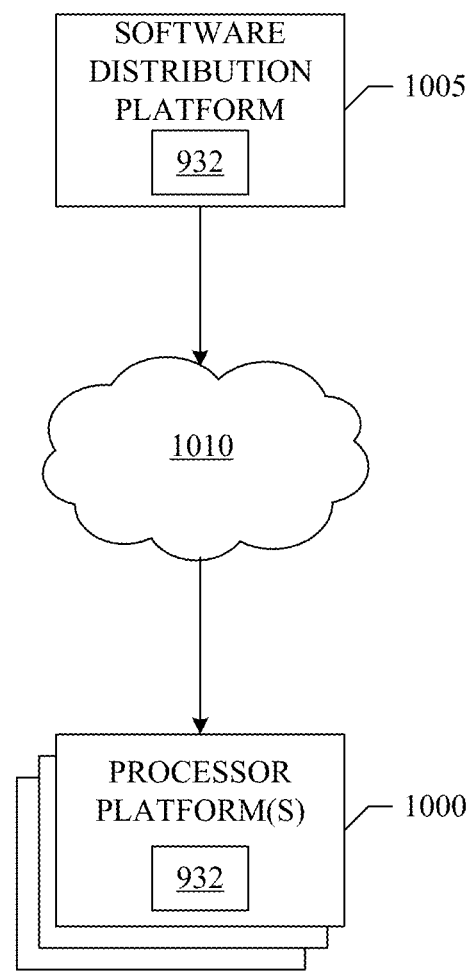
FIG. 10 is a block diagram of an example software distribution platform to distribute software (e.g., software corresponding to the example computer readable instructions of FIGS. 5, 6, 7 and/or 8) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1005 to distribute software such as the example computer readable instructions 932 of FIG. 9 to third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 932 of FIG. 9. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the computer readable instructions 932, which may correspond to the example computer readable instructions 500, 505P, 520P and/or 525P of FIGS. 5, 6, 7 and/or 8, as described above. The one or more servers of the example software distribution platform 1005 are in communication with a network 1010, which may correspond to any one or more of the Internet and/or any of the example networks, such as the networks 135 and/or 926 described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 932 from the software distribution platform 1005. For example, the software, which may correspond to the example computer readable instructions 500, 505P, 520P and/or 525P of FIGS. 5, 6, 7 and/or 8, may be downloaded to the example processor platform 900, which is to execute the computer readable instructions 932 to implement the provider data certification system 100 and/or the advertisement measurement system 200. In some example, one or more servers of the software distribution platform 1005 periodically offer, transmit, and/or force updates to the software (e.g., the example computer readable instructions 932 of FIG. 9) to ensure improvements, patches, updates, etc. are distributed and applied to the software at the end user devices.

From the foregoing, it will be appreciated that example methods, apparatus and articles of manufacture have been disclosed that implement an addressable measurement framework. The disclosed methods, apparatus and articles of manufacture improve the efficiency of using a computing device by improving the accuracy of measuring addressable vs. linear advertisement impressions made with computing devices, such as media devices (e.g., televisions, set top boxes, etc.). Such accurate ratings measurements can, for example, be used to improve efficiency of addressable advertisement delivery. The disclosed methods, apparatus and articles of manufacture are accordingly directed to one or more improvement(s) in the functioning of a computer.

The foregoing disclosure provides example solutions to implement an addressable measurement framework. The following further examples, which include subject matter such as an apparatus to perform addressable advertisement measurement, a non-transitory computer readable medium including instructions that, when executed, cause at least one processor to perform addressable advertisement measurement, and a method to perform addressable advertisement measurement, are disclosed herein. The disclosed examples can be implemented individually and/or in one or more combinations.

Example 1 includes an apparatus to perform addressable advertisement measurement. The apparatus of example 1 includes a data pre-processor to perform a common homes analysis of provider data and panel data to determine a coverage footprint associated with the provider data, the provider data including at least one of return path data reported by a plurality of set-top boxes or automatic content recognition data reported by a plurality of smart media devices, the panel data reported by media device meters. The apparatus of example 1 also includes a ratings estimator to weight a portion of the provider data based on the common homes analysis, weight a portion of the panel data based on the common homes analysis, and calculate an addressable advertisement rating based on the weighted portion of the provider data and the weighted portion of the panel data.

Example 2 includes the apparatus of example 1, wherein the provider data includes the return path data reported by the plurality of set-top boxes, and to perform the common homes analysis, the data pre-processor is to analyze the provider data to identify a first portion of the provider data corresponding to a first portion of the coverage footprint associated with first ones of the set top boxes that are return path data capable, analyze the provider data to identify a second portion of the provider data corresponding to a second portion of the coverage footprint associated with second ones of the set top boxes that are not return path data capable, and compare the first portion of the provider data with the portion of the panel data to determine whether the first portion of the provider data is also representative of the second portion of the coverage footprint, the portion of the panel data also representative of the second portion of the coverage footprint associated with the second ones of the set top boxes that are not return path data capable.

Example 3 includes the apparatus of example 2, wherein the ratings estimator is to weight the portion of the panel data to represent the second portion of the coverage footprint when the first portion of the provider data is determined to not be representative of the second portion of the coverage footprint.

Example 4 includes the apparatus of example 1, wherein the provider data includes the automatic content recognition data reported by the plurality of smart media devices, and to perform the common homes analysis, the data pre-processor is to analyze the provider data to identify a first portion of the provider data corresponding to a first portion of the coverage footprint associated with first ones of the smart media devices that are capable of performing automatic content recognition, analyze the provider data to identify a second portion of the provider data corresponding to a second portion of the coverage footprint associated with second ones of the smart media devices that are at least one of not network connected or that are not opted in to perform automatic content recognition, and compare the first portion of the provider data with the portion of the panel data to determine whether the first portion of the provider data is also representative of the second portion of the coverage footprint, the portion of the panel data also representative of the second portion of the coverage footprint associated with the second ones of the smart media devices that are at least one of not network connected or that are not opted in to perform automatic content recognition.

Example 5 includes the apparatus of example 4, wherein the ratings estimator is to weight the portion of the panel data to represent the second portion of the coverage footprint when the first portion of the provider data is determined to not be representative of the second portion of the coverage footprint.

Example 6 includes the apparatus of any one of examples 1 to 5, wherein the ratings estimator is to identify addressable advertisement impressions represented in the provider data, and calculate, based on the weighted portion of the provider data and the weighted portion of the panel data, the addressable advertisement rating to represent exposure to the addressable advertisement impressions.

Example 7 includes the apparatus of example 6, wherein the ratings estimator is to remove the addressable advertisement impressions from calculation of a linear advertisement rating different from the addressable advertisement rating.

Example 8 includes at least one non-transitory computer readable medium comprising computer readable instructions that, when executed, cause one or more processors to at least (i) perform a common homes analysis of provider data and panel data to determine a coverage footprint associated with the provider data, the provider data including at least one of return path data reported by a plurality of set-top boxes or automatic content recognition data reported by a plurality of smart media devices, the panel data reported by media device meters, (ii) weight a portion of the provider data based on the common homes analysis, (iii) weight a portion of the panel data based on the common homes analysis, and (iv) calculate an addressable advertisement rating based on the weighted portion of the provider data and the weighted portion of the panel data.

Example 9 includes the at least one non-transitory computer readable medium of example 8, wherein the provider data includes the return path data reported by the plurality of set-top boxes, and to perform the common homes analysis, the instructions cause the one or more processors to analyze the provider data to identify a first portion of the provider data corresponding to a first portion of the coverage footprint associated with first ones of the set top boxes that are return path data capable, analyze the provider data to identify a second portion of the provider data corresponding to a second portion of the coverage footprint associated with second ones of the set top boxes that are not return path data capable, and compare the first portion of the provider data with the portion of the panel data to determine whether the first portion of the provider data is also representative of the second portion of the coverage footprint, the portion of the panel data also representative of the second portion of the coverage footprint associated with the second ones of the set top boxes that are not return path data capable.

Example 10 includes the at least one non-transitory computer readable medium of example 9, wherein the instructions cause the one or more processors to weight the portion of the panel data to represent the second portion of the coverage footprint when the first portion of the provider data is determined to not be representative of the second portion of the coverage footprint.

Example 11 includes the at least one non-transitory computer readable medium of example 8, wherein the provider data includes the automatic content recognition data reported by the plurality of smart media devices, and to perform the common homes analysis, the instructions cause the one or more processors to analyze the provider data to identify a first portion of the provider data corresponding to a first portion of the coverage footprint associated with first ones of the smart media devices that are capable of performing automatic content recognition, analyze the provider data to identify a second portion of the provider data corresponding to a second portion of the coverage footprint associated with second ones of the smart media devices that are at least one of not network connected or that are not opted in to perform automatic content recognition, and compare the first portion of the provider data with the portion of the panel data to determine whether the first portion of the provider data is also representative of the second portion of the coverage footprint, the portion of the panel data also representative of the second portion of the coverage footprint associated with the second ones of the smart media devices that are at least one of not network connected or that are not opted in to perform automatic content recognition.

Example 12 includes the at least one non-transitory computer readable medium of example 11, wherein the instructions cause the one or more processors to weight the portion of the panel data to represent the second portion of the coverage footprint when the first portion of the provider data is determined to not be representative of the second portion of the coverage footprint.

Example 13 includes the at least one non-transitory computer readable medium of any one of examples 8 to 12, wherein the instructions cause the one or more processors to identify addressable advertisement impressions represented in the provider data, and calculate, based on the weighted portion of the provider data and the weighted portion of the panel data, the addressable advertisement rating to represent exposure to the addressable advertisement impressions.

Example 14 includes the at least one non-transitory computer readable medium of example 13, wherein the instructions cause the one or more processors to remove the addressable advertisement impressions from calculation of a linear advertisement rating different from the addressable advertisement rating.

Example 15 includes a method to perform addressable advertisement measurement. The method of example 15 includes performing, by executing an instruction with at least one processor, a common homes analysis of provider data and panel data to determine a coverage footprint associated with the provider data, the provider data including at least one of return path data reported by a plurality of set-top boxes or automatic content recognition data reported by a plurality of smart media devices, the panel data reported by media device meters. The method of example 15 also includes weighting a portion of the provider data based on the common homes analysis, weighting a portion of the panel data based on the common homes analysis, and calculating, by executing an instruction with the at least one processor, an addressable advertisement rating based on the weighted portion of the provider data and the weighted portion of the panel data.

Example 16 includes the method of example 15, wherein the provider data includes the return path data reported by the plurality of set-top boxes, and the performing of the common homes analysis includes analyzing the provider data to identify a first portion of the provider data corresponding to a first portion of the coverage footprint associated with first ones of the set top boxes that are return path data capable, analyzing the provider data to identify a second portion of the provider data corresponding to a second portion of the coverage footprint associated with second ones of the set top boxes that are not return path data capable, and comparing the first portion of the provider data with the portion of the panel data to determine whether the first portion of the provider data is also representative of the second portion of the coverage footprint, the portion of the panel data also representative of the second portion of the coverage footprint associated with the second ones of the set top boxes that are not return path data capable.

Example 17 includes the method of example 16, wherein the weighting of the portion of the panel data includes weighting the portion of the panel data to represent the second portion of the coverage footprint when the first portion of the provider data is determined to not be representative of the second portion of the coverage footprint.

Example 18 includes the method of example 15, wherein the provider data includes the automatic content recognition data reported by the plurality of smart media devices, and the performing of the common homes analysis includes analyzing the provider data to identify a first portion of the provider data corresponding to a first portion of the coverage footprint associated with first ones of the smart media devices that are capable of performing automatic content recognition, analyzing the provider data to identify a second portion of the provider data corresponding to a second portion of the coverage footprint associated with second ones of the smart media devices that are at least one of not network connected or that are not opted in to perform automatic content recognition, and comparing the first portion of the provider data with the portion of the panel data to determine whether the first portion of the provider data is also representative of the second portion of the coverage footprint, the portion of the panel data also representative of the second portion of the coverage footprint associated with the second ones of the smart media devices that are at least one of not network connected or that are not opted in to perform automatic content recognition.

Example 19 includes the method of example 18, wherein the weighting of the portion of the panel data includes weighting the portion of the panel data to represent the second portion of the coverage footprint when the first portion of the provider data is determined to not be representative of the second portion of the coverage footprint.

Example 20 includes the method of any one of examples 15 to 19, wherein the calculating of the addressable advertisement rating includes (i) identifying addressable advertisement impressions represented in the provider data, and calculating, based on the weighted portion of the provider data and the weighted portion of the panel data, the addressable advertisement rating to represent exposure to the addressable advertisement impressions, and further including removing the addressable advertisement impressions from calculation of a linear advertisement rating different from the addressable advertisement rating.

Example 21 includes at least one computer readable medium comprising computer readable instructions that, when executed, cause at least one processor to perform the method of any one of examples 15 to 20.

Example 22 includes an apparatus to perform the method of any one of examples 15 to 20.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry;
   machine readable instructions; and
   programmable circuitry to execute the machine readable instructions to at least:
   perform a comparison of provider data and panel data to identify a bias between a first segment of a coverage footprint associated with the provider data and a second segment of the coverage footprint associated with the provider data, the provider data including at least one of return path data or automatic content recognition data reported by media devices, the panel data reported by media device meters, the first segment of the coverage footprint associated with a first media device type, the second segment of the coverage footprint associated with a second media device type;

weight a portion of the provider data to determine a weighted portion of the provider data to represent the first segment of the coverage footprint;

weight a portion of the panel data to determine a weighted portion of the panel data to represent the second segment of the coverage footprint; and output an addressable advertisement rating based on the weighted portion of the provider data and the weighted portion of the panel data.

2. The apparatus of claim 1, wherein the first media device type includes first ones of the media devices that are able to report return path data, and the second media device type includes second ones of the media devices that are unable to report return path data.

3. The apparatus of claim 1, wherein the first media device type includes first ones of the media devices that are able to perform automatic content recognition, and the second media device type includes second ones of the media devices that are unable to perform automatic content recognition.

4. The apparatus of claim 1, wherein the programmable circuitry is to:

identify addressable advertisement impressions represented in the provider data; and calculate, based on the weighted portion of the provider data and the weighted portion of the panel data, the addressable advertisement rating to represent audience exposure to the addressable advertisement impressions.

5. The apparatus of claim 4, wherein the programmable circuitry is to remove the addressable advertisement impressions from calculation of a linear advertisement rating different from the addressable advertisement rating.

6. The apparatus of claim 1, wherein the bias is associated with a difference in device tuning data characteristics between the first segment of the coverage footprint associated with a first media device type and the second segment of the coverage footprint associated with a second media device type.

7. The apparatus of claim 1, wherein the programmable circuitry is to control at least one of selection or delivery of addressable advertisements to one or more target devices based on the addressable advertisement rating.

8. At least one non-transitory computer readable medium comprising computer readable instructions to cause one or more processors to at least:

perform a comparison of provider data and panel data to identify a bias between a first segment of a coverage footprint associated with the provider data and a second segment of the coverage footprint associated with the provider data, the provider data including at least one of return path data or automatic content recognition data reported by media devices, the panel data reported by media device meters, the first segment of the coverage footprint associated with a first media device type, the second segment of the coverage footprint associated with a second media device type;

weight a portion of the provider data to determine a weighted portion of the provider data to represent the first segment of the coverage footprint;

weight a portion of the panel data to determine a weighted portion of the panel data to represent the second segment of the coverage footprint; and output an addressable advertisement rating based on the weighted portion of the provider data and the weighted portion of the panel data.

9. The at least one non-transitory computer readable medium of claim 8, wherein the first media device type includes first ones of the media devices that are able to report return path data, and the second media device type includes second ones of the media devices that are unable to report return path data.

10. The at least one non-transitory computer readable medium of claim 8, wherein the first media device type includes first ones of the media devices that are able to perform automatic content recognition, and the second media device type includes second ones of the media devices that are unable to perform automatic content recognition.

11. The at least one non-transitory computer readable medium of claim 8, wherein the instructions are to cause the one or more processors to:

identify addressable advertisement impressions represented in the provider data; and calculate, based on the weighted portion of the provider data and the weighted portion of the panel data, the addressable advertisement rating to represent audience exposure to the addressable advertisement impressions.

12. The at least one non-transitory computer readable medium of claim 11, wherein the instructions are to cause the one or more processors to remove the addressable advertisement impressions from calculation of a linear advertisement rating different from the addressable advertisement rating.

13. The at least one non-transitory computer readable medium of claim 8, wherein the bias is associated with a difference in device tuning data characteristics between the first segment of the coverage footprint associated with a first media device type and the second segment of the coverage footprint associated with a second media device type.

14. The at least one non-transitory computer readable medium of claim 8, wherein the instructions are to cause the one or more processors to control at least one of selection or delivery of addressable advertisements to one or more target devices based on the addressable advertisement rating.

15. A method comprising:

performing, by executing an instruction with one or more processors, a comparison of provider data and panel data to identify a bias between a first segment of a coverage footprint associated with the provider data and a second segment of the coverage footprint associated with the provider data, the provider data including at least one of return path data or automatic content recognition data reported by media devices, the panel data reported by media device meters, the first segment of the coverage footprint associated with a first media device type, the second segment of the coverage footprint associated with a second media device type;

weighting, by executing an instruction with the one or more processors, a portion of the provider data to determine a weighted portion of the provider data to represent the first segment of the coverage footprint;

weighting, by executing an instruction with the one or more processors, a portion of the panel data to determine a weighted portion of the panel data to represent the second segment of the coverage footprint; and outputting an addressable advertisement rating based on the weighted portion of the provider data and the weighted portion of the panel data.

16. The method of claim 15, wherein the first media device type includes first ones of the media devices that are able to report return path data, and the second media device type includes second ones of the media devices that are unable to report return path data.

17. The method of claim 15, wherein the first media device type includes first ones of the media devices that are able to perform automatic content recognition, and the second media device type includes second ones of the media devices that are unable to perform automatic content recognition.

18. The method of claim 15, further including:
identifying addressable advertisement impressions represented in the provider data; and
calculating, based on the weighted portion of the provider data and the weighted portion of the panel data, the addressable advertisement rating to represent audience exposure to the addressable advertisement impressions.

19. The method of claim 18, further including removing the addressable advertisement impressions from calculation of a linear advertisement rating different from the addressable advertisement rating.

20. The method of claim 15, wherein the bias is associated with a difference in device tuning data characteristics between the first segment of the coverage footprint associated with a first media device type and the second segment of the coverage footprint associated with a second media device type.

\* \* \* \* \*